United States Patent
Du

(10) Patent No.: US 11,917,449 B2
(45) Date of Patent: Feb. 27, 2024

(54) COMMUNICATION METHOD AND DEVICE AND STORAGE MEDIUM

(71) Applicant: ZTE Corporation, Shenzhen (CN)

(72) Inventor: Weiqiang Du, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/799,335

(22) PCT Filed: Feb. 9, 2021

(86) PCT No.: PCT/CN2021/076153
§ 371 (c)(1),
(2) Date: Aug. 12, 2022

(87) PCT Pub. No.: WO2021/160105
PCT Pub. Date: Aug. 19, 2021

(65) Prior Publication Data
US 2023/0063139 A1    Mar. 2, 2023

(30) Foreign Application Priority Data
Feb. 13, 2020    (CN) .......................... 202010091507.8

(51) Int. Cl.
*H04W 28/02*   (2009.01)
*H04W 40/22*   (2009.01)
(Continued)

(52) U.S. Cl.
CPC ... *H04W 28/0263* (2013.01); *H04W 28/0268* (2013.01); *H04W 40/22* (2013.01);
(Continued)

(58) Field of Classification Search
CPC .......... H04B 7/15; H04W 4/70; H04W 16/26; H04W 28/0263; H04W 28/0268;
(Continued)

(56) References Cited

U.S. PATENT DOCUMENTS

| 2016/0381491 A1 | 12/2016 | Watfa et al. |
| 2018/0288822 A1 | 10/2018 | Lee et al. |
| 2019/0281491 A1 | 9/2019 | Cheng et al. |

FOREIGN PATENT DOCUMENTS

| CN | 108809897 A | 11/2018 |
| CN | 109246793 A | 1/2019 |

(Continued)

OTHER PUBLICATIONS

Chen, "Communication Method and Device for Device-to-Device System, Data Forwarding Method and Device, and Storage Medium," English Machine Translation, Clarivate, pp. 1-22 (Year: 2023).*

(Continued)

*Primary Examiner* — Thomas R Cairns
(74) *Attorney, Agent, or Firm* — Foley & Lardner LLP

(57) ABSTRACT

Provided are a communication method, a device and a storage medium. The communication method includes: receiving Internet Protocol (IP) data from a second communication node; and mapping the IP data to a relay bearer in a first preset mapping configuration, and transmitting the mapped IP data to a third communication node.

15 Claims, 8 Drawing Sheets

(51) Int. Cl.
  *H04W 76/14* (2018.01)
  *H04W 88/04* (2009.01)
  *H04W 92/18* (2009.01)

(52) U.S. Cl.
  CPC ............ *H04W 76/14* (2018.02); *H04W 88/04* (2013.01); *H04W 92/18* (2013.01)

(58) Field of Classification Search
  CPC ..... H04W 28/24; H04W 40/22; H04W 76/10; H04W 76/14; H04W 88/04; H04W 92/18
  See application file for complete search history.

(56) References Cited

FOREIGN PATENT DOCUMENTS

| | | | |
|---|---|---|---|
| CN | 109792326 A | 5/2019 | |
| CN | 110662202 A | 1/2020 | |
| EP | 3 579 642 A1 | 12/2019 | |
| WO | WO-2018141294 A1 * | 8/2018 | ........ H04W 28/0205 |
| WO | WO-2018174521 A1 * | 9/2018 | ............ H04W 28/02 |

OTHER PUBLICATIONS

Qualcomm Incorporated, "ProSe Priority determination in ProSe UE-NW Relay", SA WG2 Meeting #110, S2-152681, Jul. 10, 2015, Dubrovnik, Croatia (6 pages).

International Search Report for corresponding application PCT/CN2021/076153 filed Feb. 9, 2021; dated May 11, 2021.

3GPP, Technical Specification Group Services and System Aspects, Study on system enhancement for Proximity based Services (ProSe) in the 5G System (5GS) (Release 17), 3GPP TR 23.752, V0.3.0, Jan. 2020 (73 pages).

Decision to Grant on JP Appl. No. 2022-549061 dated Aug. 23, 2023 (with English translation, 6 pages).

Huawei, Hisilicon, "Summary of email discussion [95bis#15][LTE/FeD2D] Bearer modelling and adaption layer," 3GPP TSG-RAN WG2 #96; R2-167883; Nov. 14-18, 2016; Reno, Nevada (7 pages).

ZTE Corporation, et al., "Discussion on NR SL Relay Architecture," 3GPP TSG RAN WG2 Meeting #111 electronic, R2-2006737, online, Aug. 17-28, 2020 (13 pages).

Extended European Search Report for EP Appl. No. 21754200.0, dated Dec. 12, 2023 (9 pages).

Qualcomm Incorporated, "Modifications to solution#6: Layer-3 UE-to-Network Relay", SA WG2 Meeting #136AH, S2-2000574. Jan. 17, 2020, Incheon, Korea (4 pages).

* cited by examiner

COMMUNICATION METHOD AND DEVICE AND STORAGE MEDIUM

This application claims priority to Chinese Patent Application No. 202010091507.8 filed with the China National Intellectual Property Administration (CNIPA) on Feb. 13, 2020, the disclosure of which is incorporated herein by reference in its entirety.

TECHNICAL FIELD

The present application relates to communications, for example, a communication method, a device and a storage medium.

BACKGROUND

With the development of wireless multimedia traffic, people's demand for high data rates and better user experience is increasing, thus putting high requirements on the system capacity and coverage of cellular networks. In order that a wider range of network communications can be supported, sidelink (SL)-based relay communication technology has received extensive attention. In a 5G New Radio (NR) system, how to perform relay communication is an urgent problem to be solved.

SUMMARY

Embodiments of the present application provide a communication method, a device and a storage medium, thereby effectively implementing sidelink relay communication in a 5G NR system.

An embodiment of the present application provides a communication method applied by a first communication node. The method includes the following.

Internet Protocol (IP) data is received from a second communication node.

The IP data is mapped to a relay bearer in a first preset mapping configuration and transmitted to a third communication node.

An embodiment of the present application provides a communication method applied by a first communication node. The method includes the following.

Downlink data is received from a third communication node.

A second communication node to which the downlink data belongs is determined according to an IP address in the downlink data.

The downlink data is mapped to PC5 data, the PC5 data is mapped to a PC5 DRB in a second preset mapping configuration, and the PC5 data is transmitted to the second communication node to which the downlink data belongs.

An embodiment of the present application provides a device including a memory and one or more processors.

The memory is configured to store one or more programs.

The one or more programs, when executed by the one or more processors, cause the one or more processors to perform the method according to any one of the preceding embodiments.

An embodiment of the present application provides a storage medium, which is configured to store a computer program which, when executed by a processor, causes the processor to perform the method according to any one of the preceding embodiments.

DETAILED DESCRIPTION

Figure 1:
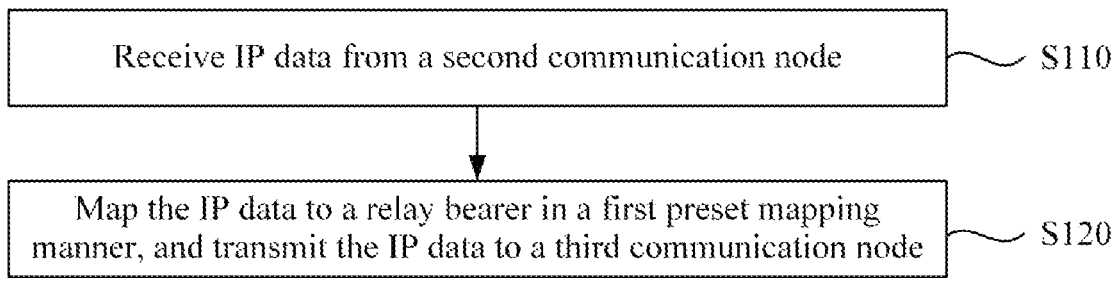
FIG. 1 is a flowchart of a communication method according to an embodiment of the present application.

Embodiments of the present application are described below in conjunction with drawings.

Application scenarios such as public safety, social networks, short-range data sharing and local advertising results in an increasing demand for understanding and communicating with people or things nearby. The cellular network centered on a base station has significant limitations in supporting high data rates and proximity services. Under this background, device-to-device (D2D) communication technology has emerged. The application of D2D technology can reduce the burden of the cellular network, reduce the battery power consumption of a user equipment (UE), increase a data rate, and improve the robustness of network infrastructure so that the requirements for traffic with a high data rate and a proximity service are well satisfied. The D2D technology is also referred to as proximity services (ProSe) and sidelink (SL) communication. An interface between devices is a PC5 interface.

In order that a wider range of network communications can be supported, sidelink (SL)-based relay communication technology has received extensive attention. In accordance with the objects of communication, sidelink communication technology may be divided into two types.

(1) UE-to-network relay: This communication technology supports a data relay function provided for a UE in an area where the base station has no coverage or has a weak coverage capability. A UE that has a requirement for communication with the base station but cannot be directly connected to the base station is a remote UE, and a UE that provides a relay function for the remote UE is referred to as a relay UE.

(2) UE-to-UE relay: This communication technology supports two UEs that have a communication requirement but have no direct communication capabilities or direct communication conditions in communicating with each other with the assistance of another support UE. A UE that has the communication requirement is a remote UE, and a UE that provides a relay function for the remote UE is referred to as a relay UE.

In accordance with the implementation of relay technology, sidelink relay communication technology may be divided into two types.

(1) IP layer (Layer3)-based relay technology: The relay UE forwards data according to IP information (such as an IP address and a port number) of a data packet, and the remote UE neither establishes a radio resource control (RRC) connection with the base station (gNB) nor establishes a connection with a core network.

(2) Access stratum (Layer2)-based relay technology: The remote UE establishes a connection with the gNB and the core network through the relay UE and forwards bearer data between the relay UE and the gNB.

In an actual communication process, a Layer3-based relay is simple to implement but has poor reliability and safety. However, though a Layer2-based relay is complex to implement, the Layer2-based relay supports better reliability and safety than the Layer3-based relay and can effectively support the mobility and safety of the remote UE. No mature relay communication technology has been developed in a 5G NR system. In view of this, the present application provides a communication method for efficiently achieving sidelink relay communication in the 5G NR system.

In an embodiment, FIG. 1 is a flowchart of a communication method according to an embodiment of the present application. As shown in FIG. 1, the embodiment is applied to a first communication node for the transmission of uplink data. For example, the first communication node may be a relay UE. As shown in FIG. 1, the embodiment includes S110 and S120.

In S110, IP data is received from a second communication node.

In S120, the IP data is mapped to a relay bearer in a first preset mapping configuration and transmitted to a third communication node.

In the embodiment, during the communication of the second communication node with a base station, a Uu link quality or a relay link quality of the second communication node deteriorates due to the mobility of the second communication node and the dynamics of a network environment. In this case, the first communication node may serve as a relay node between the second communication node and the third communication node to forward transmission data between the second communication node and the third communication node. In an embodiment, after receiving the IP data from the second communication node, the first communication node may map the IP data to the relay bearer in the preconfigured first preset mapping configuration to transmit the IP data to the third communication node.

In an embodiment, a protocol data unit (PDU) session selected by the first communication node for the IP data includes one of the following.

The PDU session refers to an independent PDU session established for the IP data, where the IP data is transmitted through a data radio bearer (DRB) corresponding to the independent PDU session.

The PDU session refers to refers to a PDU session of the first communication node which is used for transmitting the IP data.

In an embodiment, in the case where at least two second communication nodes are connected to the first communication node, the first preset mapping configuration includes one of a one-to-one mapping or a many-to-one mapping.

The one-to-one mapping is used for indicating that IP data of different second communication nodes is sent through different relay Uu DRBs, separately; and the many-to-one mapping is used for indicating that IP data of the at least two second communication nodes is mapped to the same relay Uu DRB to be sent.

In an embodiment, in the case where the first communication node is connected to the second communication node through a New Radio sidelink interface (NR PC5) and the second communication node is connected to the third communication node through an NR Uu, the many-to-one mapping includes one of the mapping configurations below.

The IP data of the second communication node is mapped to a relay Uu DRB according to a Uu quality of service (QoS) rule and a DRB configuration of the first communication node.

The IP data is mapped to a relay Uu DRB based on a mapping relationship between PC5 DRBs and Uu DRBs which is configured or preconfigured by the third communication node.

The IP data is mapped to a relay Uu DRB based on a mapping relationship between PC5 QoS flows and NR Uu QoS flows and an NR Uu DRB configuration which are configured or preconfigured by the third communication node.

The IP data is mapped to a relay Uu DRB based on a mapping relationship between PC5 QoS flows and Uu DRBs which is configured or preconfigured by the third communication node.

In an embodiment, in the case where the first communication node is connected to the second communication node through NR PC5 and the second communication node is connected to the third communication node through the NR Uu, before the IP data is received from the second communication node is received, the method further includes the following.

A relay connection request and/or a PC5 unicast connection request are received from the second communication node.

A Uu DRB and a downlink PC5 DRB and a mapping between uplink and downlink data are established according to configuration information fed back by the third communication node. In the embodiment, after the relay connection request and/or the PC5 unicast connection request are received from the second communication node and before the Uu DRB and the downlink PC5 DRB are established according to the configuration information fed back by the third communication node, QoS information in the relay connection request and the PC5 unicast connection request may be sent to the third communication node.

In an embodiment, in the case where the first communication node is connected to the second communication node through NR PC5 and the second communication node is connected to the third communication node through the NR Uu, during establishing of a Layer2 link connection between the first communication node and the second communication node, pre-acquired PC5 QoS information is mapped to Uu QoS information in a third preset mapping configuration.

In an embodiment, the third preset mapping configuration includes the following.

A 5G QoS identifier (5QI) on a PC5 interface (PC5 5QI, PQI) in a PC5 QoS flow is mapped to an identical Uu 5QI.

In the case where the identical Uu 5QI does not match the PQI, a 5QI closest to a QoS attribute represented by the PQI is selected from a standard 5QI list.

A guaranteed flow bit rate (GFBR) value and a maximum flow bit rate (MFBR) value in a Uu QoS flow are set to a GFBR value and an MFBR value in the PC5 QoS flow.

In an embodiment, after the pre-acquired PC5 QoS information is mapped to the Uu QoS information, the method further includes the following.

A PDU session establishment request is sent to the third communication node according to a Uu QoS flow, where the PDU session establishment request is used for forwarding the IP data of the second communication node.

Alternatively, a PDU session modification request is sent to the third communication node, where the PDU session modification request is used for modifying a current PDU session and carrying the Uu QoS information obtained after the mapping.

In an embodiment, the communication method further includes: receiving a relay Uu DRB or a PC5 DRB and a mapping relationship between PC5 data and Uu data which are configured by the third communication node.

In an embodiment, in the case where the first communication node is connected to the second communication node through NR PC5 and the second communication node is connected to the third communication node through the NR Uu, the mapping relationship between PC5 data and Uu data includes one of: a mapping between PC5 QoS flows and Uu QoS flows, a mapping between PC5 DRBs and Uu DRBs, a mapping between PC5 QoS flows and Uu DRBs or a mapping between PC5 DRBs and Uu QoS flows.

In an embodiment, in the case where the first communication node is connected to the second communication node through NR PC5 and the second communication node is connected to the third communication node through the NR Uu, a time period within which the third communication node configures the mapping relationship between PC5 data and Uu data for the first communication node includes one of the following.

The time period is a period after the first communication node sends the PDU session establishment request or the PDU session modification request.

The time period is a period after the first communication node and the second communication node establish a PC5 RRC connection, the first communication node reports PC5 DRB information, where the PC5 DRB information includes at least one of: a bearer identifier, a radio link control (RLC) mode, a logical channel identifier, a logical channel priority or an RLC-related configuration.

The time period is a period after the first communication node sends sidelink UE information (SUI) to the third communication node.

In an embodiment, in the case where the first communication node is connected to the second communication node through NR PC5 and the second communication node is connected to the third communication node through the NR Uu, the mapping relationship between PC5 data and Uu data includes one of: a mapping configuration between NR PC5 QoS flows and NR Uu QoS flows; a mapping configuration between NR PC5 QoS flows and NR Uu DRBs; a mapping configuration between NR PC5 DRBs and NR Uu DRBs; or a mapping configuration between NR PC5 DRBs and NR Uu QoS flows.

The mapping configuration between NR PC5 QoS flows and NR Uu QoS flows includes at least one of: a mapping between PC5 QoS information and Uu QoS information or a mapping between QoS flow identifiers (QFIs) and PC5 flow identifiers (PFIs). The mapping between PC5 QoS information and Uu QoS information includes at least one of the following. A 5QI in a Uu QoS flow is mapped to an identical PC5 PQI; in the case where the identical Uu 5QI does not match the PQI, a 5QI closest to a QoS attribute represented by the PQI is selected from a standard 5QI list; and a GFBR value and an MFBR value in the Uu QoS flow are directly set to a GFBR and an MFBR in the PC5 QoS information.

A PQI in a PC5 QoS flow is mapped to an identical Uu 5QI; in the case where the identical Uu 5QI does not match the PQI, a PQI closest to a QoS attribute represented by the 5QI is selected from a standard PQI list; and a GFBR and an MFBR in the PC5 QoS flow are directly set to a GFBR and an MFBR in Uu QoS info.

The mapping configuration between NR PC5 QoS flows and NR Uu DRBs includes at least one of: a mapping between PC5 PFIs and Uu DRB identifiers, a mapping between PC5 PQIs and Uu DRB priorities or a mapping between PC5 PQIs and Uu logical channel priorities.

The mapping configuration between NR PC5 DRBs and NR Uu DRBs includes at least one of: a mapping between PC5 DRB priorities and Uu DRB priorities, a mapping between PC5 DRB identifiers and Uu DRB identifiers, a mapping between PC5 logical channel priorities and Uu logical channel priorities or a mapping between PC5 logical channel identifiers and Uu logical channel identifiers.

The mapping configuration between NR PC5 DRBs and NR Uu QoS flows includes at least one of: a mapping between PC5 DRB identifiers and Uu QFIs, a mapping between PC5 DRB priorities and Uu 5QIs or a mapping between PC5 logical channel priorities and Uu 5QIs.

In an embodiment, in the case where the first communication node is connected to the second communication node through Long-Term Evolution (LTE) PC5 and the second communication node is connected to the third communication node through an NR Uu, the many-to-one mapping includes one of the mapping configurations below.

The IP data of the second communication node is mapped to a relay NR Uu DRB according to a Uu uplink QoS rule and a DRB configuration of the first communication node.

The IP data is mapped to a relay NR Uu DRB based on a mapping relationship between LTE PC5 logical channels and NR Uu DRBs which is configured or preconfigured by the third communication node.

The IP data of the second communication node is mapped to a Uu QoS flow and then to a relay NR Uu DRB based on a ProSe Per-Packet Priority (PPPP) of PC5 data received from the second communication node and a mapping relationship between PPPPs and 5QIs and an NR Uu DRB configuration which are configured or preconfigured by the third communication node.

The IP data of the second communication node is mapped to a relay NR Uu DRB based on a PPPP value of PC5 data received from the second communication node and a mapping relationship between PPPP values and NR Uu DRBs which is configured or preconfigured by the third communication node.

In an embodiment, in the case where the first communication node is connected to the second communication node through LTE PC5 and the second communication node is connected to the third communication node through the NR Uu, before the IP data is received from the second communication node is received, the method further includes the following.

A relay connection request and/or a PC5 unicast connection request are received from the second communication node.

QoS information in a relay connection established by the relay connection request and a PC5 unicast connection established by the PC5 unicast connection request is sent to the third communication node.

A Uu DRB and a mapping between uplink and downlink data are established according to configuration information fed back by the third communication node. In the embodiment, after the relay connection request and/or the PC5 unicast connection request are received from the second communication node and before the Uu DRB is established according to the configuration information fed back by the third communication node, the QoS information in the relay connection established by the relay connection request and the PC5 unicast connection established by the PC5 unicast connection request may be sent to the third communication node.

In an embodiment, in the case where the first communication node is connected to the second communication node through LTE PC5 and the second communication node is connected to the third communication node through the NR Uu, during establishing of a Layer2 link connection between the first communication node and the second communication node, a pre-acquired PPPP value is mapped to NR Uu QoS information in a fourth preset mapping configuration.

In an embodiment, the fourth preset mapping configuration includes the following.

A PPPP-5QI mapping table configured or preconfigured by the third communication node is based on.

In an embodiment, after the pre-acquired PC5 PPPP value is mapped to the NR Uu QoS information, the method further includes the following.

A PDU session establishment request is sent to the third communication node according to the Uu QoS information, where the PDU session establishment request is used for forwarding the IP data of the second communication node.

Alternatively, a PDU session modification request is sent to the third communication node, where the PDU session modification request is used for modifying a current PDU session and carrying the Uu QoS information obtained after the mapping.

In an embodiment, the communication method further includes: receiving a relay Uu DRB and a mapping relationship between PC5 data and Uu data which are configured by the third communication node.

In an embodiment, in the case where the first communication node is connected to the second communication node through LTE PC5 and the second communication node is connected to the third communication node through the NR Uu, the mapping relationship between PC5 data and Uu data includes one of: a mapping between PC5 logical channels and Uu DRBs, a mapping between PC5 PPPP data flows and Uu DRBs or a mapping between PC5 PPPP data flows and Uu QoS flows.

In an embodiment, in the case where the first communication node is connected to the second communication node through LTE PC5 and the second communication node is connected to the third communication node through the NR Uu, a time period within which the third communication node configures the mapping relationship between PC5 data and Uu data for the first communication node includes one of the following.

A time period after the first communication node sends the PDU session establishment request or the PDU session modification request.

A time period after the first communication node and the second communication node establish a relay connection, the first communication node reports LTE PC5 logical channel information, where the PC5 logical channel information includes at least one of: an RLC mode, a logical channel identifier, a logical channel priority or an RLC-related configuration.

A time period after the first communication node sends *SUI* to the third communication node.

In an embodiment, in the case where the first communication node is connected to the second communication node through LTE PC5 and the second communication node is connected to the third communication node through the NR Uu, the mapping relationship between PC5 data and Uu data includes one of: a mapping configuration between LTE PC5 logical channels and NR Uu DRBs; a mapping configuration between LTE PC5 PPPP flows and NR Uu DRBs; a mapping configuration between LTE PC5 PPPP flows and NR Uu QoS flows; or a mapping configuration between LTE PC5 PPPP values and NR Uu QoS information.

The mapping configuration between LTE PC5 logical channels and NR Uu DRBs includes at least one of: a mapping between LTE PC5 logical channel identifiers and NR Uu DRB identifiers, a mapping between LTE PC5 logical channel priorities and NR Uu DRB priorities, a mapping between LTE PC5 logical channel priorities and NR Uu logical channel priorities or a mapping between LTE PC5 logical channel identifiers and NR Uu logical channel identifiers.

The mapping configuration between LTE PC5 PPPP flows and NR Uu DRBs includes at least one of: a mapping configuration between LTE PPPP values and Uu DRB priorities or a mapping between LTE PPPP values and Uu logical channel priorities.

The mapping configuration between LTE PC5 PPPP flows and NR Uu QoS flows includes at least one of a mapping configuration between LTE PPPP values and NR Uu QoS information.

The mapping configuration between LTE PC5 PPPP values and NR Uu QoS information includes at least one of a mapping table between LTE PC5 PPPP values and NR Uu 5QIs.

In an embodiment, in the case where the first communication node is connected to the second communication node through NR PC5 and the second communication node is connected to the third communication node through an LTE Uu, the many-to-one mapping includes one of the mapping configurations below.

The IP data of the at least two second communication nodes is mapped to an LTE Uu DRB according to an uplink traffic flow template (TFT) and a DRB configuration of the first communication node.

The IP data is mapped to an LTE Uu DRB based on a mapping relationship between NR PC5 DRBs and LTE Uu DRBs which is configured or preconfigured by the third communication node.

The IP data is mapped to an LTE Uu DRB based on a mapping relationship between NR PC5 QoS flows and LTE Uu DRBs which is configured or preconfigured by the third communication node.

The IP data is mapped to an LTE Uu DRB based on a mapping relationship between NR PC5 QoS flows and LTE Uu Evolved Packet System (EPS) bearers and an LTE Uu DRB configuration which are configured or preconfigured by the third communication node.

In an embodiment, in the case where the first communication node is connected to the second communication node through NR PC5 and the second communication node is connected to the third communication node through the LTE Uu, pre-acquired NR PC5 QoS information is mapped as LTE Uu QoS information in a fifth preset mapping configuration.

In an embodiment, the fifth preset mapping configuration includes the following.

A PQI in an NR PC5 QoS flow is mapped to an identical LTE Uu 5QI.

In the case where the identical LTE Uu 5QI does not match the PQI, a QoS class identifier (QCI) closest to a QoS attribute represented by the PQI is selected from a standard LTE QCI list.

A GFBR value and an MFBR value in a Uu QoS flow are set to a GFBR and an MFBR value in the PC5 QoS flow.

In an embodiment, after the pre-acquired PC5 PPPP value is mapped to the NR Uu QoS information, the method further includes the following.

A PDU session establishment request is sent to the third communication node according to the Uu QoS information, where the PDU session establishment request is used for forwarding the IP data of the second communication node.

Alternatively, a PDU session modification request is sent to the third communication node, where the PDU session modification request is used for modifying a current PDU session and carrying the Uu QoS information obtained after the mapping.

In an embodiment, the communication method further includes: receiving a relay Uu DRB and a mapping relationship between PC5 data and Uu data which are configured by the third communication node.

In an embodiment, in the case where the first communication node is connected to the second communication node through NR PC5 and the second communication node is connected to the third communication node through the LTE Uu, the mapping relationship between PC5 data and Uu data includes one of: a mapping between NR PC5 QoSs and LTE Uu EPS bearers, a mapping between NR PC5 DRBs and LTE Uu DRBs, a mapping between NR PC5 QoS flows and LTE Uu DRBs or a mapping between NR PC5 DRBs and LTE Uu EPS bearers.

In an embodiment, in the case where the first communication node is connected to the second communication node through NR PC5 and the second communication node is connected to the third communication node through the LTE Uu, a time period within which the third communication node configures the mapping relationship between PC5 data and Uu data for the first communication node includes one of the following.

After the first communication node sends a PDU session connectivity request or a bearer resource modification request.

After the first communication node and the second communication node establish a PC5 RRC connection, the first communication node reports NR PC5 DRB information, where the NR PC5 DRB information includes at least one of: a bearer identifier, an RLC mode, a logical channel identifier, a logical channel priority or an RLC-related configuration.

After the first communication node sends SUI to the third communication node.

In an embodiment, in the case where the first communication node is connected to the second communication node through NR PC5 and the second communication node is connected to the third communication node through the LTE Uu, the mapping relationship between PC5 data and Uu data includes one of: a mapping configuration between NR PC5 QoS flows and LTE Uu EPS bearers; a mapping configuration between NR PC5 QoS flows and LTE Uu DRBs; a mapping configuration between NR PC5 DRBs and LTE Uu DRBs; or a mapping configuration between NR PC5 DRBs and LTE Uu EPS bearers.

The mapping configuration between NR PC5 QoS flows and LTE Uu EPS bearers includes at least one of: a mapping between PC5 QFIs and Uu EPS bearer identifiers or a mapping between NR PC5 QoS info and LTE Uu QoS info. The mapping between PC5 QoS info and Uu QoS info includes at least one of the following.

A QCI in a Uu QoS flow is mapped to an identical PC5 PQI.

In the case where the identical Uu QCI does not match the PQI, a QCI closest to a QoS attribute represented by the PQI is selected from a standard QCI list.

A GFBR and an MFBR in the Uu QoS flow are directly set to a GFBR and an MFBR in the PC5 QoS info.

A PQI in a PC5 QoS flow is mapped to an identical Uu QCI.

In the case where the identical Uu QCI does not match the PQI, a PQI closest to a QoS attribute represented by the QCI is selected from a standard PQI list.

A GFBR and an MFBR in the PC5 QoS flow are directly set to a GFBR and an MFBR in Uu QoS info.

The mapping configuration between NR PC5 QoS flows and LTE Uu DRBs includes at least one of: a mapping between PC5 PFIs and Uu DRB identifiers, a mapping between PC5 PQIs and Uu DRB priorities or a mapping between PC5 PQIs and Uu logical channel priorities.

The mapping configuration between NR PC5 DRBs and LTE Uu DRBs includes at least one of: a mapping between PC5 DRB priorities and Uu DRB priorities, a mapping between PC5 DRB identifiers and Uu DRB identifiers, a mapping between PC5 logical channel priorities and Uu logical channel priorities or a mapping between NR PC5 logical channel identifiers and LTE Uu logical channel identifiers.

The mapping configuration between NR PC5 DRBs and LTE Uu EPS bearers includes at least one of: a mapping between PC5 DRB priorities and Uu EPS bearer QCIs, a mapping between PC5 DRB identifiers and Uu EPS bearer identifiers or a mapping between PC5 logical channels and Uu EPS bearer QCIs.

In an embodiment, in the case where the Uu link quality or the relay link quality of the second communication node fails, a switching manner of the second communication node includes one of: switching from a Uu connection to a relay connection; switching from a relay connection to a Uu connection; or switching from a connection to a first communication node in a first place to a connection to a first communication node in a second place.

In an embodiment, in the case where the switching manner of the second communication node is switching from the Uu connection to the relay connection, to-be-transmitted uplink data buffered in the second communication node includes one of the connection manners below.

Unprocessed IP data in the second communication node is directly switched to a relay link for transmission.

For IP data having been mapped to a Uu QoS flow in the second communication node, the Uu QoS flow is mapped to a PC5 QoS flow based on a mapping configuration from Uu QoS flows to PC5 QoS flows which is configured or preconfigured by the third communication node, or the Uu QoS flow is mapped to a PC5 DRB based on a mapping configuration from Uu QoS flows to PC5 DRBs which is configured or preconfigured by the third communication node.

For IP data having been mapped to a Uu DRB in the second communication node, the IP data is decrypted according to a Uu Packet Data Convergence Protocol (PDCP), and the Uu DRB is mapped to a PC5 DRB based on a mapping configuration from Uu DRBs to PC5 DRBs which is configured or preconfigured by the third communication node.

In an embodiment, in the case where the switching manner of the second communication node is switching from the relay connection to the Uu connection, to-be-transmitted uplink data buffered in the second communication node includes one of the connection manners below.

Unprocessed IP data in the second communication node is directly switched to a Uu link for transmission.

For IP data having been mapped to a PC5 QoS flow in the second communication node, the PC5 QoS flow is mapped to a Uu QoS flow based on a mapping configuration from PC5 QoS flows to Uu QoS flows which is configured or preconfigured by the third communication node, or the PC5 QoS flow is mapped to a Uu DRB based on a mapping configuration from PC5 QoS flows to Uu DRBs which is configured or preconfigured by the third communication node.

For IP data having been mapped to a PC5 DRB in the second communication node, the IP data is decrypted according to a PC5 PDCP, and the PC5 DRB is mapped to a Uu DRB based on a mapping configuration from PC5 DRBs to Uu DRBs which is configured or preconfigured by the third communication node.

In an embodiment, in the case where the switching manner of the second communication node is switching from the first communication node in the first place to the first communication node in the second place, to-be-transmitted uplink data buffered in the second communication node includes one of the connection manners below.

IP data and PC5 QoS flow data from the second communication node to a first communication node in the first place is forwarded to a first communication node in the second place.

For IP data having been mapped to a PC5 DRB established with the first communication node in the first place, the IP data is decrypted according to a PDCP layer established with the first communication node in the second place and mapped to a PC5 DRB established with the first communication node in the second place and having the same logical channel priority.

For IP data having been buffered in the first communication node in the first place, the first communication node in the first place continues an uplink transmission.

In an embodiment, in the case where the Uu link quality or the relay link quality of the second communication node fails, a link switching policy includes one of the following.

A link switching criterion or a measurement configuration is configured by the third communication node.

A link switching criterion is configured or preconfigured by the third communication node.

In an embodiment, in the case where the switching manner of the second communication node is switching from the Uu connection to the relay connection, the link switching criterion includes at least one of: a Uu link quality threshold, a traffic type or a PC5 interface link quality threshold.

The measurement configuration includes a Uu measurement configuration and a relay measurement configuration.

In an embodiment, in the case where the switching manner of the second communication node is switching from the relay connection to the Uu connection, the link switching criterion includes at least one of: a Uu link quality threshold; a PC5 interface link quality threshold; a Uu link quality threshold of the first communication node; a channel busy ratio (CBR) threshold of a PC5 interface resource pool; or a traffic type/traffic requirement.

Figure 2:
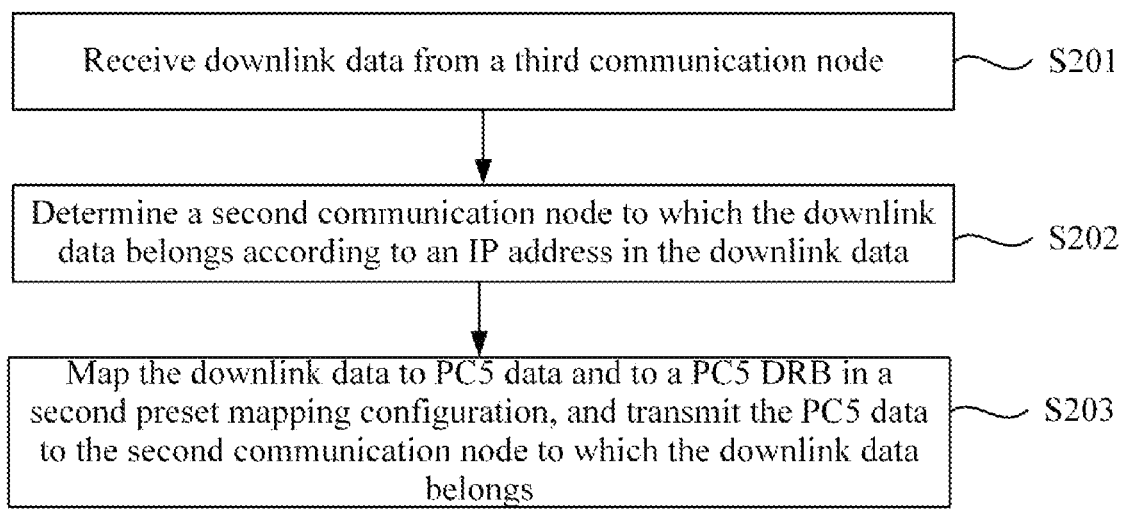
FIG. 2 is a flowchart of another communication method according to an embodiment of the present application.

FIG. 2 is a flowchart of another communication method according to an embodiment of the present application. The embodiment is applied to a first communication node for the transmission of downlink data. As shown in FIG. 2, the embodiment includes S201 to S03.

In S201, downlink data is received from a third communication node is received.

In S202, a second communication node to which the downlink data belongs is determined according to an IP address in the downlink data.

In S203, the downlink data is mapped to PC5 data in a second preset mapping configuration, and the PC5 data is transmitted to the second communication node to which the downlink data belongs.

In an embodiment, in the case where the first communication node is connected to the second communication node through NR PC5 and the second communication node is connected to the third communication node through an NR Uu, the second preset mapping configuration includes one of the mapping configurations below.

The downlink data is mapped to a corresponding PC5 DRB according to a QoS rule derived by the first communication node and a PC5 DRB configuration configured by the third communication node.

In the case where a PC5 DRB is a bi-directional bearer, a reverse mapping is performed based on a mapping relationship from uplink PC5 DRBs to Uu DRBs.

A Uu QoS flow is mapped to a PC5 QoS flow, and the PC5 QoS flow is then mapped to a PC5 DRB based on a mapping relationship from NR Uu QoS flows to PC5 QoS flows and a PC5 DRB configuration which are configured by the third communication node.

The downlink data is mapped to a PC5 DRB based on a mapping relationship from NR Uu QoS flows to PC5 DRBs which is configured or preconfigured by the third communication node.

The downlink data is mapped to a PC5 DRB based on a mapping relationship between Uu DRBs and PC5 DRBs which is configured or preconfigured by the third communication node.

In an embodiment, in the case where the first communication node is connected to the second communication node through LTE PC5 and the second communication node is connected to the third communication node through an NR Uu, the second preset mapping configuration includes one of the mapping configurations below.

IP data of the second communication node is mapped to an LTE PC5 logical channel based on a mapping relationship between NR Uu DRBs and LTE PC5 logical channels which is configured or preconfigured by the third communication node.

IP data of the second communication node is mapped to an LTE PC5 logical channel based on a mapping relationship between NR Uu DRBs and LTE PC5 PPPP values which is configured or preconfigured by the third communication node.

IP data of the second communication node is mapped to an LTE PC5 logical channel based on a mapping relationship between NR Uu QoS flows and LTE PC5 PPPP data flows which is configured or preconfigured by the third communication node.

In an embodiment, in the case where the first communication node is connected to the second communication node through NR PC5 and the second communication node is connected to the third communication node through an LTE Uu, the second preset mapping configuration includes one of the mapping configurations below.

The downlink data is mapped to a corresponding NR PC5 DRB according to a QoS rule derived by the first communication node and a PC5 DRB configuration configured by the third communication node.

IP data is mapped to an NR PC5 DRB based on a mapping relationship between LTE Uu DRBs and NR PC5 DRBs which is configured or preconfigured by the third communication node.

IP data is mapped to an NR PC5 DRB based on a mapping relationship between LTE Uu DRBs and NR PC5 QoS flows which is configured or preconfigured by the third communication node.

IP data is mapped to an LTE Uu DRB based on a mapping relationship between LTE Uu EPS bearers and NR PC5 QoS flows and an LTE Uu DRB configuration which are configured or preconfigured by the third communication node.

It is to be noted that in the present application, uplink transmission, uplink, uplink data and the like involved between the first communication node and the second communication device refer to a process of sending by the second communication node and receiving by the first communication node; accordingly, downlink transmission, downlink, downlink data and the like involved between the first communication node and the second communication node refer to a process of sending by the first communication node and receiving by the second communication node.

In an implementation, in the scenario of L3 UE-to-network relay data routing, NR PC5 is used between a first communication node and a second communication node and an NR Uu (Uu) is used between the first communication node and a third communication node. For example, the first communication node is a relay UE, the second communication node is a remote UE, and the third communication node is a base station.

For L3 UE-to-network relay, no RRC connection is established between the remote UE and the base station, that is, the base station neither identifies the remote UE nor stores the context of the remote UE, and a core network neither identifies the remote UE nor establishes and maintains a PDU session for the remote UE. An IP data packet of the remote UE is sent to the relay UE through a PC5 unicast connection, the relay UE sends the IP data packet of the remote UE to the base station through a Uu bearer of the relay UE, and the base station transmits data to a 5G core (5GC) through a PDU session of the relay UE.

Figure 3:
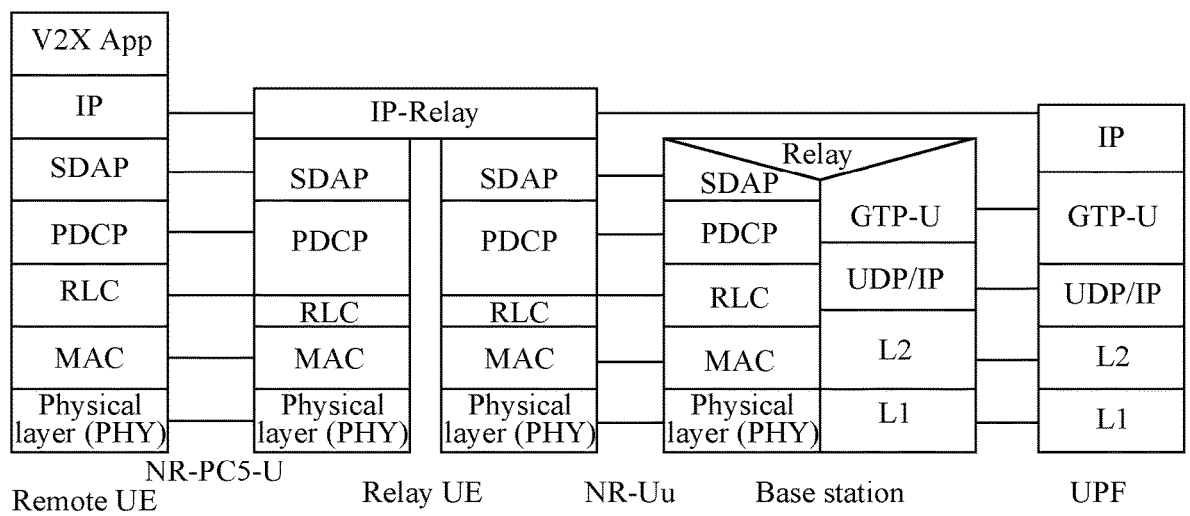
FIG. 3 is a schematic diagram illustrating a user plane protocol stack according to an embodiment of the present application.

For the L3 UE-to-network relay, the remote UE establishes no connection with the base station. Thus, the relay UE does not need to forward control plane data, a sidelink control plane protocol stack is used between the relay UE and the remote UE, and an NR Uu protocol stack is used between the relay UE and the base station. FIG. 3 is a schematic diagram illustrating a user plane protocol stack according to an embodiment of the present application. As shown in FIG. 3, the user plane protocol stack is a user plane protocol stack of the L3 UE-to-network relay.

In the case of uplink user plane data routing, processes in S1 to S4 are included.

In S1, the remote UE receives the IP data packet from an application layer and transmits the IP data packet to the relay UE through a self-derived QoS processing rule and a PC5 unicast bearer configuration.

After receiving the data packet, the relay UE can determine whether the data packet is data terminated at the relay UE or data to be forwarded in the mapping configurations below.

In mapping configuration one, the remote UE and the relay UE negotiate through RRC signaling and establish a PC5 unicast bearer or logical channel specially used for forwarding the data of the remote UE. Optionally, the PC5 unicast bearer or logical channel may be defined in the manner of a PC5 DRB identifier or logical channel identifier (LCID).

In mapping configuration two, data from the remote UE to a gNB and data from the remote UE to the relay UE use different source IDs (SRC IDs) and destination IDs (DST IDs), and the relay UE can distinguish the data sent to the relay UE itself from the data to be relayed through an ID included in a media access control (MAC) subheader.

In S2, the relay UE receives the IP data packet from the remote UE, parses the IP data packet, and determines whether the IP data packet needs to be relayed and forwarded to the gNB through the ID in the MAC subheader or the negotiated logical channel/bearer. If the IP data packet needs to be relayed and forwarded, the relay UE reads IP information of the data packet of the remote UE, modifies the corresponding IP header of the data packet of the remote UE by using a network address translation (NAT) function, and forwards the IP data packet.

In S3, the relay UE maps the IP data packet to be forwarded to a relay Uu bearer between the relay UE and the base station and transmits the IP data packet to the base station. For example, the IP data packet is mapped in one of the mapping configurations below.

In mapping configuration one, the relay UE establishes an independent PDU session for the data to be relayed and forwarded and transmits the data of the remote UE on a DRB corresponding to the PDU session.

In mapping configuration two, the relay UE transmits the data of the remote UE by using a PDU session of the relay UE.

Based on the above two mapping configurations, in the case where multiple remote UEs are connected to the same relay UE, the relay UE may select the two mapping configurations below.

In mapping configuration one, a one-to-one mapping is performed, that is, IP data of different remote UEs is sent through different Uu DRBs, separately.

In mapping configuration two, a many-to-one mapping is performed, that is, IP data packets from the multiple remote UEs and with similar QoSs may be mapped to the same Uu DRB to be sent.

The many-to-one mapping includes one of the mapping configurations below.

In mapping configuration one, the relay UE does not distinguish the remote UEs from which the IP data packets are and maps the IP data packets of the multiple remote UEs to the Uu DRB according to a Uu QoS rule and a DRB configuration of the relay UE.

In mapping configuration two, the relay UE maps the IP data to be forwarded to the Uu DRB based on a mapping relationship between PC5 DRBs and Uu DRBs whish is configured or preconfigured by the base station (for example, based on a mapping between bearer identifiers or based on a mapping between bearer/logical channel priorities).

In mapping configuration three, the relay UE maps, based on a logical channel or bearer priority of a PC5 DRB, the IP data packets to a relay Uu DRB having the same logical channel priority.

In mapping configuration four, the relay UE maps the data packets in a PC5 QoS flow to a Uu QoS flow based on a PQI of the received PC5 data of the remote UEs and a mapping relationship between PQIs and 5QIs which is configured or preconfigured by the base station and further transmits the IP data to the base station through the corresponding relay Uu DRB according to a Uu DRB configuration.

In S4, the base station receives user plane data of the remote UE forwarded by the relay UE and further maps the data packet to an NG interface transport tunnel of the PDU session of the relay UE to send the data packet to a user plane function (UPF) of the core network.

In the case of downlink user plane data routing, processes S1 to S3 are included.

In Layer3-based relay technology, the base station and the core network process and forward data of the remote UE as data of the relay UE in a data communication process. The base station receives downlink data from the UPF to the relay UE and maps the downlink data of the relay UE to a relay UE Uu bearer. The relay UE determines, according to IP information in a data packet sent to the relay UE and NAT, a remote UE to which the data packet belongs and then forwards the downlink data to the corresponding remote UE through a PC5 DRB.

In S1, the relay UE receives the downlink data from the base station, reads the IP information in the downlink data, determines which remote UE the data packet belongs to according to the stored NAT information, and replaces an IP header in the data packet with IP information of the corresponding remote UE.

In S2, the relay UE maps the data packet to a PC5 bearer and sends the data packet to the remote UE. The data packet is mapped in one of the mapping configurations below.

In mapping configuration one, the relay UE maps the data of the remote UE to the corresponding PC5 DRB according to a self-derived QoS rule and a PC5 DRB configuration configured by the base station.

In mapping configuration two, a Uu QoS flow is mapped to a PC5 QoS flow, and the PC5 QoS flow is then mapped to a PC5 DRB based on a mapping relationship between 5QIs and POIs and a PC5 DRB configuration which are configured by the base station.

In mapping configuration three, the relay UE maps the data packet of the remote UE to a PC5 DRB based on a mapping relationship between 5QI/QFIs and PC5 DRB priorities which is configured or preconfigured by the base station.

In mapping configuration four, if a PC5 DRB is a bi-directional bearer, a reverse mapping may be performed based on a mapping relationship between uplink PC5 DRBs and Uu DRBs.

In mapping configuration five, the data packet is mapped to a PC5 DRB based on a mapping relationship between Uu DRBs and PC5 DRBs (for example, a mapping between bearer identifiers or a mapping between bearer/logical channel priorities) which is configured or preconfigured by the base station.

In mapping configuration six, based on a bearer priority or logical channel priority of a Uu DRB configured or preconfigured by the base station, the data packet of the remote UE is mapped to a PC5 DRB having the same bearer/logical channel priority.

In S3, the remote UE receives the downlink data from the PC5 DRB.

In an implementation, in the scenario of L3 UE-to-network relay data routing, NR PC5 is used between a first communication node and a second communication node and NR Uu is used between the first communication node and a third communication node. For example, the first communication node is a relay UE, the second communication node is a remote UE, and the third communication node is a base station. In the embodiment, during the transmission of uplink data and downlink data, the configuration performed by the base station is as shown in FIG. 4.

For a Layer3-based UE-to-network relay, the remote UE neither needs to establish an RRC connection with a gNB nor establishes a PDU session with a core network. The remote UE searches for an appropriate relay UE which relays and forwards IP data for the remote UE. The remote UE in an RRC connected state establishes an uplink SL bearer based on a configuration of the base station. The remote UE in an RRC idle/inactive state establishes an uplink SL bearer based on an SL bearer configuration in a system message. A UE without coverage establishes an uplink SL bearer based on an SL bearer configuration in preconfiguration information. After receiving a relay request and a PC5 unicast connection request from the remote UE, the relay UE reports QoS-related information in the relay request and the PC5 unicast connection request to the base station, establishes a Uu DRB and a downlink PC5 DRB according to configuration information delivered by the base station, and forwards a data packet of the remote UE according to a mapping relationship configured by the base station.

Figure 4:
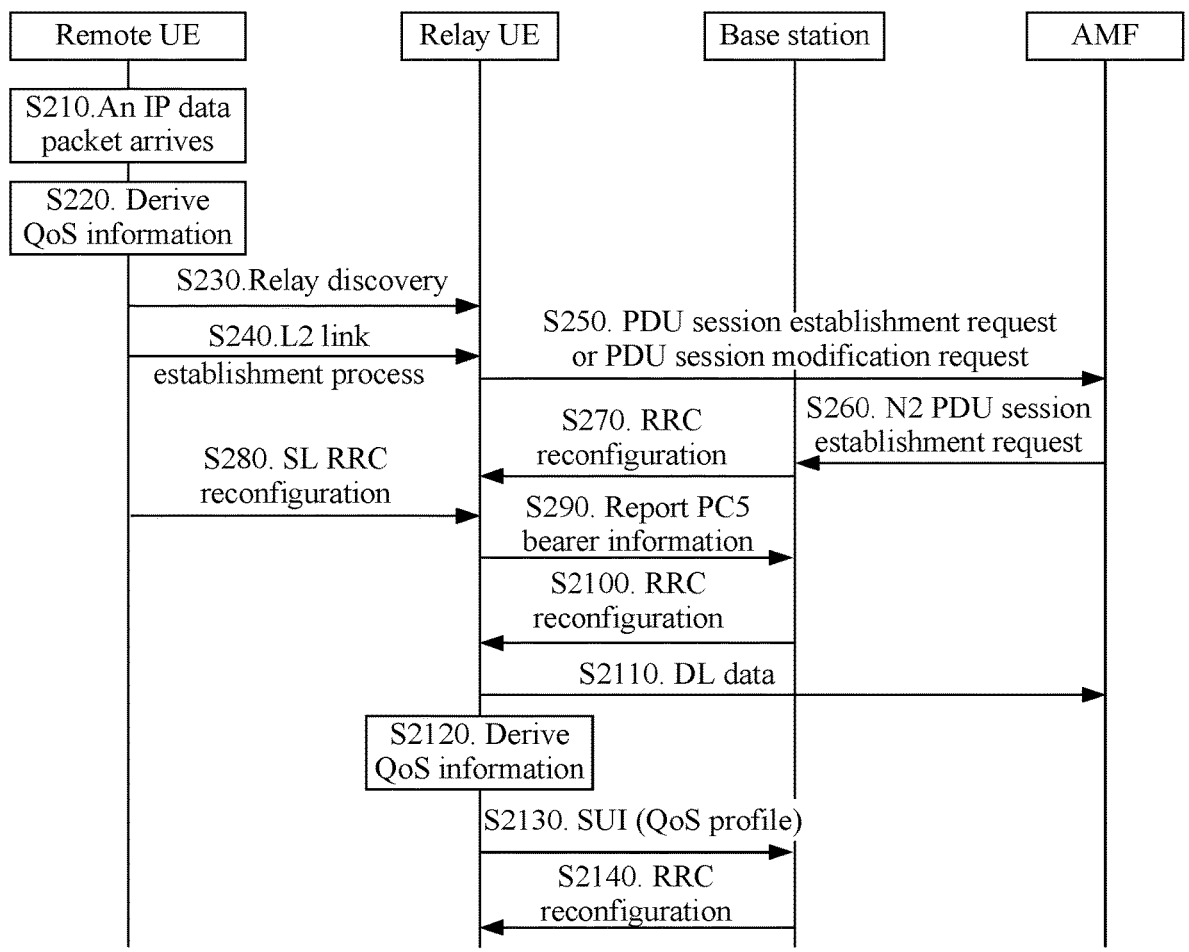
FIG. 4 is a schematic diagram of a process of establishing a Uu data forwarding bearer when a relay UE forwards data for a remote UE according to an embodiment of the present application.
Figure 5:
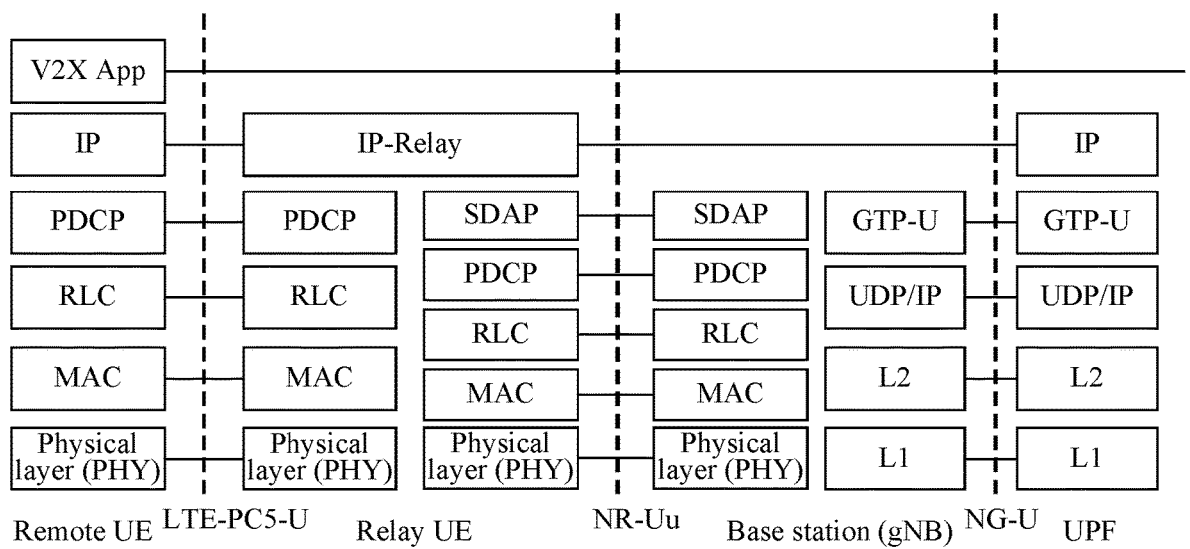
FIG. 5 is a schematic diagram illustrating another user plane protocol stack according to an embodiment of the present application.

FIG. 4 is a schematic diagram of a process of establishing a Uu data forwarding bearer when a relay UE forwards data for a remote UE according to an embodiment of the present application. As shown in FIG. 4, the process of establishing a forwarding bearer in the embodiment includes S210 to S2140.

In S210, an IP data packet arrives.

In S220, the remote UE derives QoS information.

In S230, a relay is discovered.

In S240, the remote UE performs L2 link establishment process.

In S250, the relay UE sends PDU session establishment request or PDU session modification request to the AMF.

In S260, the AMF sends an N2 PDU session establishment request to the base station.

In S270, the base station performs RRC reconfiguration for the relay UE.

In S280, the remote UE performs SL RRC reconfiguration for the relay UE.

In S290, the relay UE reports PC5 bearer information to the base station.

In S2100, the base station performs RRC reconfiguration for the relay UE.

In S2110, the relay UE sends downlink (DL) data to the AMF.

In S2120, the relay UE derives QoS information.

In S2130, the relay UE sends SUI (QoS profile) to the base station.

In S2140, the base station performs RRC reconfiguration for the relay UE.

In the embodiment, the remote UE establishes an L2 link connection with the relay UE via higher-layer signaling. Then, the relay UE maps a PC5 QoS flow (such as a PQI, an MFBR and a GFBR) obtained in the L2 link establishment process to a Uu QoS flow. For example, the PC5 QoS flow is mapped to the Uu QoS flow in the mapping configuration below.

The PQI in the PC5 QoS flow is mapped to an identical Uu 5QI. If no identical Uu 5QI matches the PQI, a 5QI closest to a QoS attribute represented by the PQI is selected from a standard 5QI list. A GFBR value and an MFBR value in the Uu QoS flow are directly set to a GFBR value and an MFBR value in PC5 QoS info.

The relay UE sends a PDU session establishment request according to the Uu QoS flow mapped to, so as to establish a new PDU session for the remote UE, where the new PDU session is specially used for forwarding the data packet of the remote UE. Alternatively, the relay UE sends a PDU session modification request to modify an existing PDU session, where the PDU session modification request includes the Uu QoS flow mapped to. The core network configures the corresponding PDU session according to the QoS in the PDU session establishment request or the PDU session modification request and notifies the base station of a configuration result. The base station configures the corresponding relay UE Uu DRB or a PC5 DRB for the relay UE to forward downlink data of the remote UE and a mapping relationship between PC5 data and Uu data for the relay UE to forward uplink and downlink data of the remote UE (for example, a mapping between PC5 QoS flows and Uu QoS flows and a mapping between PC5 DRBs and Uu DRBs) according to the configuration result of the PDU session.

The base station may configure the mapping relationship between PC5 data and Uu data for the relay UE at the time point below.

Time point one is after the relay UE sends the PDU session establishment request or the PDU session modification request, for example, S250, S260 and S270 in FIG. 4.

Time point two is after the relay UE and the remote UE establish a PC5 RRC connection, and the relay UE reports PC5 DRB information including at least one of a bearer identifier, an RLC mode, a logical channel identifier, a logical channel priority or an RLC-related configuration, for example, S280, S290 and S2100 in FIG. 4.

Time point three is after the relay UE sends the *SUI* to the base station, for example, S2110, S2120, S2130 and S2140 in FIG. 4.

The base station configures a Uu data forwarding bearer (relay DRB) for the relay UE, where the configuration of the Uu data forwarding bearer includes at least one of: a data forwarding bearer indication, a bearer identifier, an RLC mode, a logical channel identifier, a logical channel group identifier, a logical channel priority, a guaranteed bit rate, a bucket size duration or an RLC-related configuration.

The base station configures the PC5 DRB for the relay UE, where the PC5 DRB is a downlink PC5 DRB (which is sent by the relay UE and received by the remote UE). Configuration information includes related parameters required for sending a sidelink radio bearer (SLRB); an RLC acknowledged mode (AM) or unacknowledged mode (UM); and other RLC-related and logical channel-related configuration information.

In the embodiment, the base station configures the mapping relationship between PC5 data and Uu data for the relay UE to forward the uplink and downlink data of the remote UE, where the mapping relationship includes one of the following.

Mapping relationship one is a mapping configuration between NR PC5 QoS flows and NR Uu QoS flows, which includes at least one of a mapping between PC5 QoS info and Uu QoS info or a mapping between QFIs and PFIs.

Mapping relationship two is a mapping configuration between NR PC5 QoS flows and NR Uu DRBs, which includes at least one of a mapping between PC5 PFIs and Uu DRB identifiers, a mapping between PC5 5QIs and Uu DRB priorities or a mapping between PC5 5QIs and Uu logical channel priorities.

Mapping relationship three is a mapping configuration between NR PC5 DRBs and NR Uu DRBs, which includes at least one of a mapping between PC5 DRB priorities and Uu DRB priorities, a mapping between PC5 DRB identifiers and Uu DRB identifiers or a mapping between PC5 logical channel priorities and Uu logical channel priorities.

The base station sends the preceding configuration information to the relay UE through an RRC reconfiguration message.

In an implementation, in the scenario of L3 UE-to-network relay data routing, LTE PC5 is used between a first communication node and a second communication node and an NR Uu (Uu) is used between the first communication node and a third communication node. For example, the first communication node is a relay UE, the second communication node is a remote UE, and the third communication node is a base station.

In the embodiment, the embodiment is similar to the preceding embodiment where NR PC5 is used between the first communication node and the second communication node and the NR Uu is used between the first communication node and the third communication node. A difference is that the remote UE is connected to the relay UE by an LTE sidelink and the relay UE is connected to the base station by the NR Uu.

In the case of uplink user plane data routing, S1 to S4 are included.

In S1, the remote UE receives an IP data packet from an application layer and sends the IP data packet to the corresponding LTE PC5 logical channel according to a PPPP value provided by an upper layer.

After receiving the data packet, the relay UE can determine whether the data packet is data terminated at the relay UE or data to be forwarded in the mapping configurations below.

In mapping configuration one, the remote UE and the relay UE negotiate which logical channels are specially used for forwarding the data of the remote UE through the upper layer. Optionally, the logical channels may be defined in the manner of LCIDs.

In mapping configuration two, data from the remote UE to a gNB and data from the remote UE to the relay UE use different SRC IDs and DST IDs, and the relay UE can distinguish the data sent to the relay UE itself from the data to be relayed through an ID included in a MAC subheader.

In S2, the relay UE receives the IP data packet from the remote UE, parses the IP data packet, and determines whether the IP data packet needs to be relayed and forwarded to the gNB through the ID in the MAC subheader or the negotiated logical channel. If the IP data packet needs to be relayed and forwarded, the relay UE reads IP information of the data packet of the remote UE, modifies the corresponding IP header of the data packet of the remote UE by using an NAT function, and forwards the IP data packet.

In S3, the relay UE maps the IP data packet to be forwarded to a relay Uu bearer between the relay UE and the base station and transmits the IP data packet to the base station. For example, the IP data packet is mapped in one of the mapping configurations below.

In mapping configuration one, the relay UE establishes an independent PDU session for the data to be relayed and forwarded and transmits the data of the remote UE on a DRB corresponding to the PDU session.

In mapping configuration two, the relay UE transmits the data of the remote UE by using a PDU session of the relay UE.

Based on the above two mapping configurations, in the case where multiple remote UEs are connected to the same relay UE, the relay UE may select the two mapping configurations below.

In mapping configuration one, a one-to-one mapping is performed, that is, data of different remote UEs is sent through different Uu DRBs, separately.

In mapping configuration two, a many-to-one mapping is performed, that is, data packets from the multiple remote UEs and with similar PPPPs may be mapped to the same Uu DRB to be sent.

The many-to-one mapping includes one of the mapping configurations below.

In mapping configuration one, the relay UE does not distinguish the remote UEs from which IP data packets are and maps the IP data packets of the multiple remote UEs to a relay NR Uu DRB according to a Uu UL QoS rule and a DRB configuration of the relay UE.

In mapping configuration two, the relay UE maps the data to be forwarded to a relay NR Uu DRB based on a mapping relationship between LTE PC5 logical channels and NR Uu DRBs (for example, a mapping between logical channel priorities) which is configured or preconfigured by the base station.

In mapping configuration three, the relay UE maps the LTE PC5 logical channel to a relay NR Uu DRB having the same logical channel priority.

In mapping configuration four, the relay UE maps an LTE PC5 data packet to a Uu QoS flow based on a PPPP value of the received PC5 data of the remote UEs and a mapping relationship between PPPP values and 5QIs which is configured or preconfigured by the base station and further transmits IP data to the base station through the corresponding relay NR Uu DRB according to a Uu DRB configuration.

In mapping configuration five, the relay UE maps an LTE PC5 data packet to a relay NR Uu DRB based on a PPPP value of the received PC5 data of the remote UEs and a mapping relationship between PPPP values and NR Uu DRBs which is configured or preconfigured by the base station and transmits the LTE PC5 data packet to the base station.

In S4, the base station receives user plane data of the remote UE forwarded by the relay UE and further maps the data packet to an NG interface transport tunnel of the PDU session of the relay UE to send the data packet to a UPF of the core network.

In the case of downlink user plane data routing, S1 to S3 are included.

In S1, the relay UE receives downlink data from the base station, reads IP information in the downlink data, determines which remote UE the data packet belongs to according to the stored NAT information, and replaces an IP header in the data packet with IP information of the corresponding remote UE.

In S2, the relay UE maps the data packet to a PC5 bearer and sends the data packet to the remote UE. The data packet is mapped in one of the mapping configurations below.

In mapping configuration one, the relay UE maps an NR Uu data flow to a PC5 PPPP data flow based on a mapping relationship between 5QIs and PPPPs which is configured by the base station and then maps the PC5 PPPP data flow to an LTE PC5 logical channel.

In mapping configuration two, the relay UE maps the data packet of the remote UE to an LTE PC5 logical channel based on a mapping relationship between 5QI/QFIs and PC5 logical channel priorities which is configured or preconfigured by the base station.

In mapping configuration three, the relay UE maps the data packet to an LTE PC5 logical channel based on a mapping relationship between NR Uu DRBs and LTE PC5 logical channels (for example, a mapping between bearer/logical channel priorities) which is configured or preconfigured by the base station.

In mapping configuration four, the relay UE maps, based on a bearer priority or logical channel priority of an NR Uu DRB configured or preconfigured by the base station, the data packet of the remote UE to an LTE PC5 logical channel having the same logical channel priority.

In S3, the remote UE receives the downlink data from the PC5 logical channel.

In an implementation, in the scenario of L3 UE-to-network relay data routing, LTE PC5 is used between a first communication node and a second communication node and NR Uu is used between the first communication node and a third communication node. For example, the first communication node is a relay UE, the second communication node is a remote UE, and the third communication node is a base station. In the embodiment, during the transmission of uplink data and downlink data, the configuration performed by the base station is as shown in FIG. 6.

Figure 6:
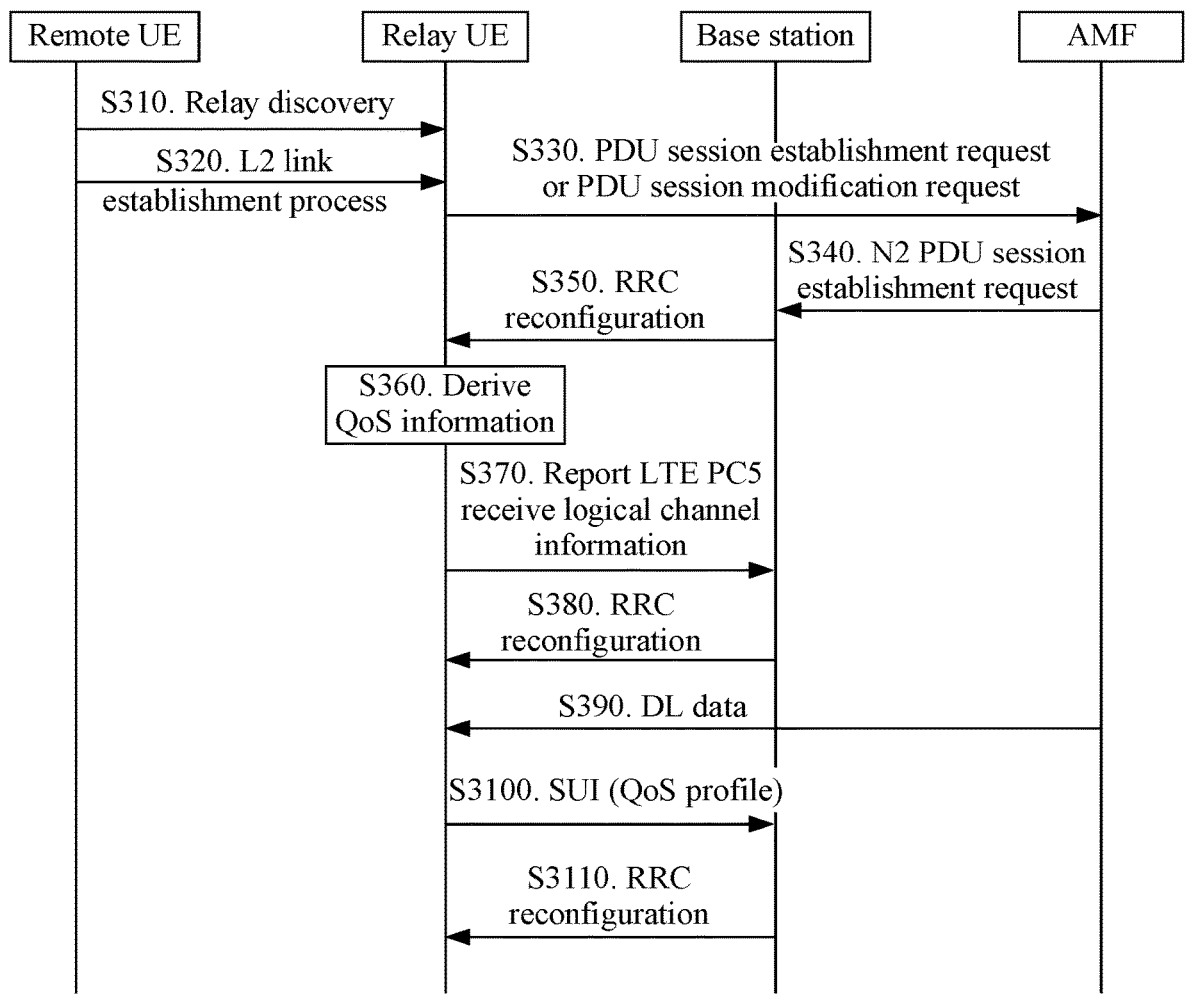
FIG. 6 is a schematic diagram of another process of establishing a Uu data forwarding bearer when a relay UE forwards data for a remote UE according to an embodiment of the present application.
Figure 7:
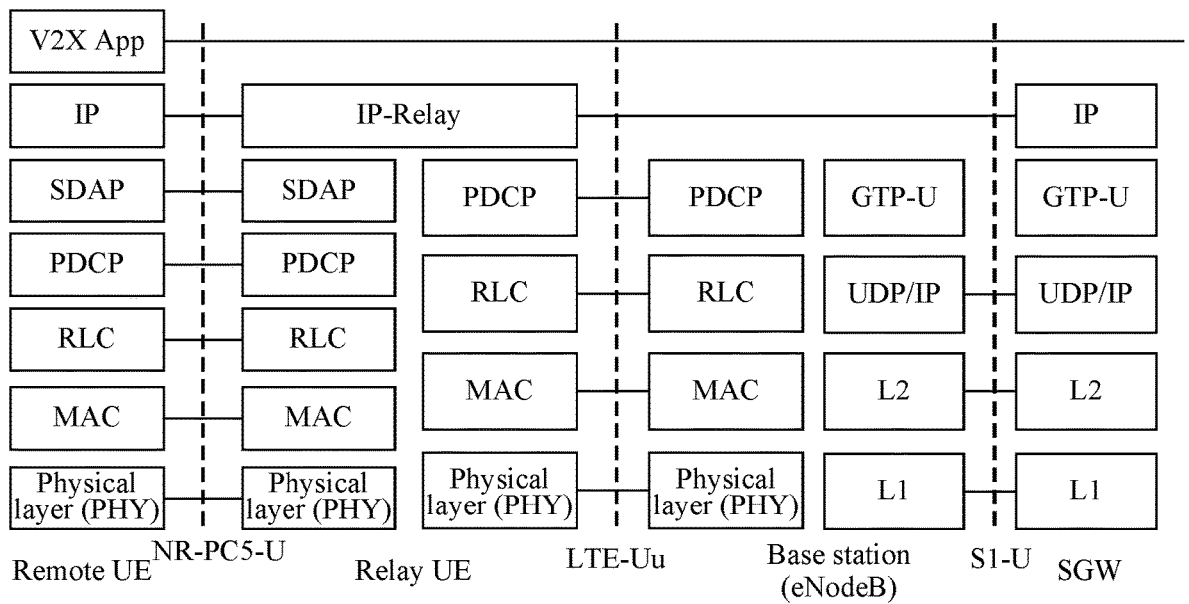
FIG. 7 is a schematic diagram illustrating another user plane protocol stack according to an embodiment of the present application.

FIG. 6 is a schematic diagram of another process of establishing a Uu data forwarding bearer when a relay UE forwards data for a remote UE according to an embodiment of the present application. As shown in FIG. 6, the process of establishing a forwarding bearer in the embodiment includes S310 to S3110.

In S310, a relay is discovered.

In S320, the remote UE performs L2 link establishment process.

In S330, the relay UE sends PDU session establishment request or PDU session modification request to the AMF.

In S340, the AMF sends N2 PDU session establishment request to the base station.

In S350, the base station performs RRC reconfiguration for the relay UE.

In S360, the relay UE derives QoS information.

In S370, the relay UE reports LTE PC5 receive logical channel information to the base station.

In S380, the base station performs RRC reconfiguration for the relay UE.

In S390, the AMF sends DL data to the relay UE.

In S3100, the relay UE sends *SUI* (QoS profile) to the base station.

In S3110, the base station sends RRC reconfiguration to the relay UE.

In the embodiment, the remote UE establishes an L2 link connection with the relay UE via higher-layer signaling. Then, the relay UE maps a PPPP to Uu QoS info based on a PPPP-5QI mapping table configured or preconfigured by the base station.

The relay UE sends a PDU session establishment request according to a Uu QoS flow mapped to, so as to establish a new PDU session for the remote UE, where the new PDU session is specially used for forwarding the data packet of the remote UE. Alternatively, the relay UE sends a PDU session modification request to modify an existing PDU session, where the PDU session modification request includes the Uu QoS flow mapped to. The core network configures the corresponding PDU session according to the QoS information in the PDU session establishment request or the PDU session modification request and notifies the base station of a configuration result. The base station configures the corresponding relay UE NR Uu DRB and a mapping relationship between PC5 data and Uu data for the relay UE to forward downlink data of the remote UE (for example, a mapping between LTE PC5 PPPPs and NR DRBs, a mapping between LTE PC5 PPPPs and NR 5QIs and a mapping between LTE PC5 PPPPs and NR logical channel priorities) according to the configuration result of the PDU session.

The base station may configure the mapping relationship between PC5 data and Uu data for the relay UE at the time point below.

Time point one is after the relay UE sends the PDU session establishment request or the PDU session modification request, for example, S330, S340 and S350 in FIG. 6.

Time point two is after the relay UE and the remote UE establish a relay connection, and the relay UE reports LTE PC5 logical channel information including at least one of an RLC mode, a logical channel identifier, a logical channel priority or an RLC-related configuration, for example, S360, S370 and S380 in FIG. 6.

Time point three is after the relay UE sends the *SUI* to the base station, for example, S390, S3100 and S3110 in FIG. 6.

The relay UE configures an LTE PC5 logical channel based on system broadcast or preconfiguration information: a data forwarding bearer indication, a bearer identifier, an RLC mode, a logical channel identifier, a logical channel group identifier, a logical channel priority, a guaranteed bit rate, a bucket size duration or an RLC-related configuration.

Optionally, the base station configures the mapping relationship between PC5 data and Uu data for the relay UE to forward the downlink data of the remote UE, where the mapping relationship includes one of the following.

Mapping relationship one is a mapping between LTE PC5 PPPPs and NR Uu 5QIs.

Mapping relationship two is a mapping configuration between LTE PC5 PPPPs and NR Uu DRBs, which includes at least one of a mapping between PC5 PPPPs and Uu DRB identifiers, a mapping between PC5 PPPPs and Uu DRB priorities or a mapping between PC5 PPPPs and Uu logical channel priorities.

Mapping relationship three is a mapping configuration between LTE PC5 logical channels and NR Uu DRBs, which includes at least one of a mapping between PC5 logical channel priorities and Uu logical channel priorities or a mapping between PC5 logical channel IDs and Uu logical channel IDs.

The base station sends the preceding configuration information to the relay UE through an RRC reconfiguration message.

In an implementation, in the scenario of L3 UE-to-network relay data routing, NR PC5 is used between a first communication node and a second communication node and an LTE Uu (Uu) is used between the first communication node and a third communication node. For example, the first communication node is a relay UE, the second communication node is a remote UE, and the third communication node is a base station.

In the case of uplink user plane data routing, S1 to S4 are included.

In S1, the remote UE receives an IP data packet from an application layer and transmits the IP data packet to the relay UE through a self-derived QoS processing rule and a PC5 unicast bearer configuration.

After receiving the data packet, the relay UE can determine whether the data packet is data terminated at the relay UE or data to be forwarded in the mapping configurations below.

In mapping configuration one, the remote UE and the relay UE negotiate through RRC signaling and establish an NR PC5 unicast bearer or logical channel specially used for forwarding data of the remote UE. Optionally, which DRB is used for forwarding the data of the remote UE may be defined through an NR PC5 DRB identifier or which logical channel is used for forwarding the data of the remote UE may be defined through an LCID.

In mapping configuration two, data from the remote UE to a gNB and data from the remote UE to the relay UE use different SRC IDs and DST IDs, and the relay UE can distinguish the data sent to the relay UE itself from the data to be relayed through an ID included in a MAC subheader.

In S2, the relay UE receives the IP data packet from the remote UE, parses the IP data packet, and determines whether the IP data packet needs to be relayed and forwarded to the gNB through the ID in the MAC subheader or the negotiated logical channel or bearer. If the IP data packet needs to be relayed and forwarded, the relay UE reads IP information of the data packet of the remote UE, modifies the corresponding IP header of the data packet of the remote UE by using an NAT function, and forwards the IP data packet.

In S3, the relay UE maps the data packet to be forwarded to a relay Uu bearer between the relay UE and the base station and transmits the data packet to the base station. For example, the data packet is mapped in one of the mapping configurations below.

In mapping configuration one, the relay UE establishes an independent PDU session for the data to be relayed and forwarded and transmits the data of the remote UE on a DRB corresponding to the PDU session.

In mapping configuration two, the relay UE transmits the data of the remote UE by using a PDU session of the relay UE.

Based on the above two mapping configurations, in the case where multiple remote UEs are connected to the same relay UE, the relay UE may select the two mapping configurations below.

In mapping configuration one, a one-to-one mapping is performed, that is, data of different remote UEs is sent through different Uu DRBs, separately.

In mapping configuration two, a many-to-one mapping is performed, that is, data packets from the multiple remote UEs and with QoSs may be mapped to the same Uu DRB to be sent.

The many-to-one mapping includes one of the mapping configurations below.

In mapping configuration one, the relay UE does not distinguish the remote UEs from which IP data packets are and maps the IP data packets of the multiple remote UEs to a Uu DRB according to an uplink TFT and a DRB configuration of the relay UE.

In mapping configuration two, the relay UE maps the data to be forwarded to an LTE Uu DRB based on a mapping relationship between NR PC5 DRBs and LTE Uu DRBs whish is configured or preconfigured by the base station (for example, based on a mapping between bearer identifiers or based on a mapping between bearer/logical channel priorities).

In mapping configuration three, the relay UE maps, based on a logical channel or bearer priority of an LTE PC5 DRB, the IP data packets to a relay NR Uu DRB having the same logical channel priority.

In mapping configuration four, the relay UE maps the data packets in a PC5 QoS flow to a Uu QoS flow based on a PQI of the received NR PC5 data of the remote UEs and a mapping relationship between NR PC5 PQIs and LTE Uu QCIs which is configured or preconfigured by the base station and further transmits the data to the base station through the corresponding relay LTE Uu DRB according to a Uu DRB configuration.

In S4, the base station receives user plane data of the remote UE forwarded by the relay UE and further maps the data packet to the PDU session of the relay UE to forward the data packet to a packet data network (PDN) gateway (PGW) in the core network.

In the case of downlink user plane data routing, S1 to S3 are included.

In Layer3-based relay technology, the base station and the core network process and forward data of the remote UE as data of the relay UE in a data communication process. The base station receives downlink data sent to the relay UE and maps the downlink data of the relay UE to a relay UE Uu bearer. The relay UE determines, according to IP information in a data packet sent to the relay UE and NAT, a remote UE to which the data packet belongs and then forwards the data to the corresponding remote UE through an NR PC5 DRB.

In S1, the relay UE receives the downlink data from the base station, reads the IP information in the downlink data, determines which remote UE the data packet belongs to according to the stored NAT information, and replaces an IP header in the data packet with IP information of the corresponding remote UE.

In S2, the relay UE maps the data packet to an NR PC5 bearer and sends the data packet to the remote UE. Specifically, the data packet may be mapped in one of the mapping configurations below.

In mapping configuration one, the relay UE maps the IP data of the remote UE to the corresponding PC5 DRB according to a self-derived QoS rule and a PC5 DRB configuration configured by the base station.

In mapping configuration two, the relay UE maps a Uu QoS flow to a PC5 QoS flow and then maps the PC5 QoS flow to a PC5 DRB based on a mapping relationship between LTE Uu QCIs and NR PC5 PQIs and a PC5 DRB configuration which are configured by the base station.

In mapping configuration three, the relay UE maps the data packet of the remote UE to a PC5 DRB based on a mapping relationship between LTE Uu QCI/EPS bearer IDs and PC5 DRB priorities which is configured or preconfigured by the base station.

In mapping configuration four, if a PC5 DRB is a bi-directional bearer, a reverse mapping may be performed based on a mapping relationship between uplink NR PC5 DRBs and LTE Uu DRBs.

In mapping configuration five, the data packet is mapped to a PC5 DRB based on a mapping relationship between LTE Uu DRBs and NR PC5 DRBs (for example, a mapping between bearer identifiers or a mapping between bearer/logical channel priorities) which is configured or preconfigured by the base station.

In mapping configuration six, based on a bearer priority or logical channel priority of a Uu DRB configured or preconfigured by the base station, the data packet of the remote UE is mapped to a PC5 DRB having the same bearer/logical channel priority.

In S3, the remote UE receives the downlink data from the NR PC5 DRB.

In an implementation, in the scenario of L3 UE-to-network relay data routing, NR PC5 is used between a first communication node and a second communication node and LTE Uu is used between the first communication node and a third communication node. For example, the first communication node is a relay UE, the second communication node is a remote UE, and the third communication node is a base station. In the embodiment, during the transmission of uplink data and downlink data, the configuration performed by the base station is as shown in FIG. 8.

Figure 8:
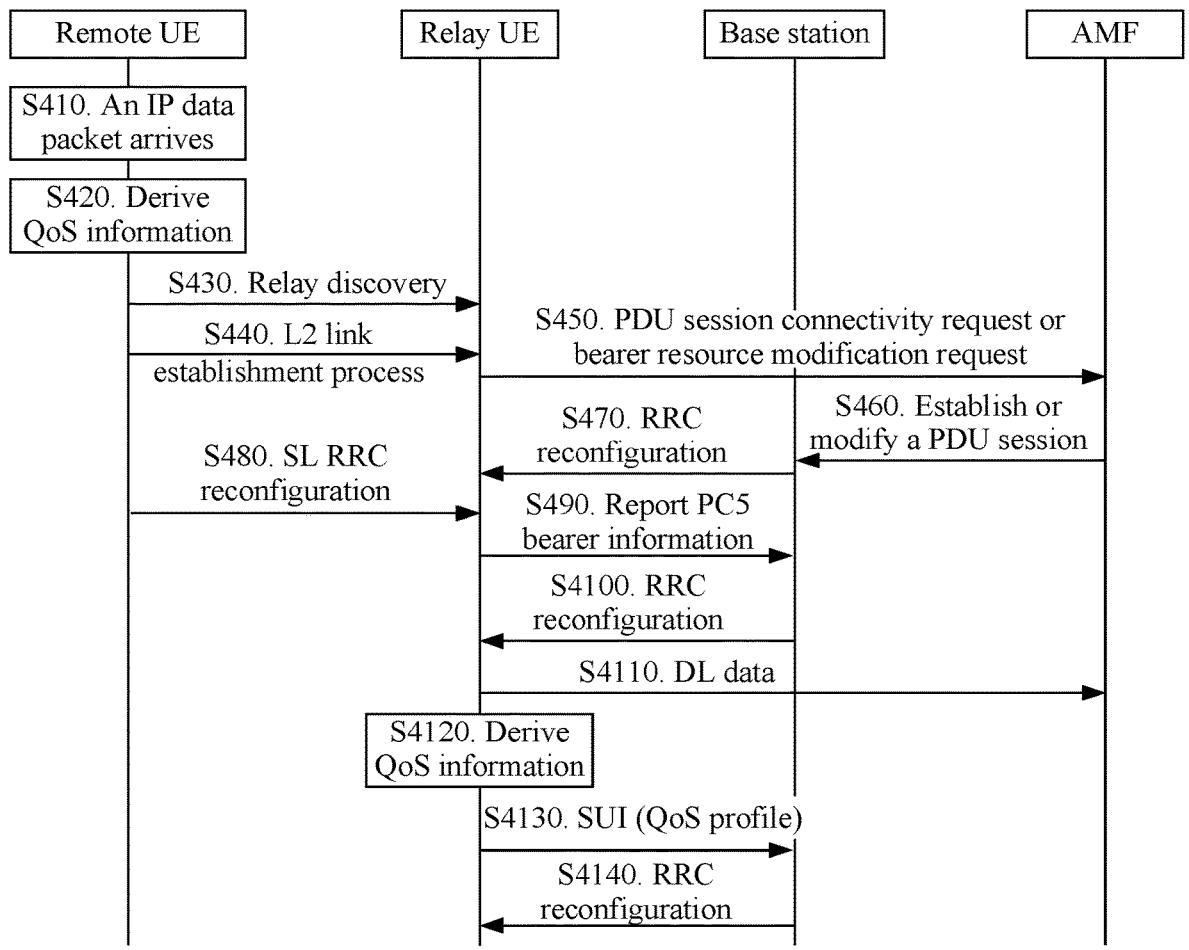
FIG. 8 is a schematic diagram of another process of establishing a Uu data forwarding bearer when a relay UE forwards data for a remote UE according to an embodiment of the present application.

FIG. 8 is a schematic diagram of another process of establishing a Uu data forwarding bearer when a relay UE forwards data for a remote UE according to an embodiment of the present application. As shown in FIG. 8, the process of establishing a forwarding bearer in the embodiment includes S410 to S4140.

In S410, an IP data packet arrives.

In S420, the remote UE derives QoS information.

In S430, a relay is discovered.

In S440, the remote UE performs L2 link establishment process.

In S450, the relay UE sends PDU session connectivity request or bearer resource modification request to the AMF.

In S460, the AMF sends a PDU session establishment request or a PDU session modification request to the base station.

In S470, the base station performs RRC reconfiguration for the relay UE.

In S480, the remote UE performs SL RRC reconfiguration for the relay UE.

In S490, the relay UE reports PC5 bearer information to the base station.

In S4100, the base station performs RRC reconfiguration to the relay UE.

In S4110, the relay UE sends DL data to the AMF.

In S4120, the relay UE derives QoS information.

In S4130, the relay UE sends *SUI* (QoS profile) to the base station.

In S4140, the base station performs RRC reconfiguration for the relay UE.

In the embodiment, the remote UE establishes an L2 link connection with the relay UE via higher-layer signaling. Then, the relay UE maps NR PC5 QoS info (such as a PQI, an MFBR and a GFBR) obtained in the L2 link establishment process as LTE Uu QoS info in the mapping configuration below.

The PQI in the NR PC5 QoS info is mapped to an identical LTE Uu QCI. If no identical Uu QCI matches the PQI, a QCI closest to a QoS attribute represented by the PQI is selected from a standard LTE QCI list. A GFBR value and an MFBR value in the Uu QoS info are directly set to a GFBR value and an MFBR value in the PC5 QoS info.

The relay UE chooses to send a PDU connectivity request according to the Uu QoS info mapped to, so as to establish a new PDU session for the remote UE, where the new PDU session is specially used for forwarding the data packet of the remote UE. Alternatively, the relay UE sends a bearer resource modification request to modify an existing PDU session, where the bearer resource modification request includes the Uu QoS info mapped to. The core network configures the corresponding PDU session according to the QoS information in the bearer resource modification request and notifies the base station of a configuration result. The base station configures the corresponding relay UE Uu DRB or a PC5 DRB for the relay UE to forward downlink data of the remote UE and a mapping relationship between PC5 data and Uu data for the relay UE to forward uplink and downlink data of the remote UE (for example, a mapping between LTE PC5 QoS flows and NR Uu QoS flows and a mapping between LTE PC5 DRBs and NR Uu DRBs) according to the configuration result of the PDU session.

The base station may configure the mapping relationship between PC5 data and Uu data for the relay UE at the time point below.

Time point one is after the relay UE sends the PDU connectivity request or the bearer resource modification request, for example, S450, S460 and S470 in FIG. 8.

Time point two is after the relay UE and the remote UE establish a PC5 RRC connection, and the relay UE reports NR PC5 DRB information including at least one of a bearer identifier, an RLC mode, a logical channel identifier, a logical channel priority or an RLC-related configuration, for example, S480, S490 and S4100 in FIG. 8.

Time point three is after the relay UE sends the *SUI* to the base station, for example, S4110, S4120, S4130 and S4140 in FIG. 8.

The base station configures a Uu data forwarding bearer (relay DRB) for the relay UE, where the configuration of the Uu data forwarding bearer includes at least one of: a data forwarding bearer indication, a bearer identifier, an RLC mode, a logical channel identifier, a logical channel group identifier, a logical channel priority, a guaranteed bit rate, a bucket size duration or an RLC-related configuration.

The base station configures the PC5 DRB for the relay UE, where the PC5 DRB is a downlink PC5 DRB (which is sent by the relay UE and received by the remote UE). Configuration information includes related parameters required for sending an SLRB; an RLC AM or UM; and other RLC-related and logical channel-related configuration information.

Optionally, the base station configures the mapping relationship between PC5 data and Uu data for the relay UE to forward the uplink and downlink data of the remote UE, where the mapping relationship includes one of the following.

Mapping relationship one is a mapping configuration between NR PC5 QoS flows and LTE Uu QoS flows, which includes at least one of a mapping between PC5 QoS info and Uu QoS info, a mapping between PQIs and QCIs or a mapping between PFIs and EPS bearer IDs.

Mapping relationship two is a mapping configuration between NR PC5 QoS flows and LTE Uu DRBs, which includes at least one of a mapping between PC5 PFIs and Uu DRB identifiers, a mapping between PC5 5QIs and Uu DRB priorities or a mapping between PC5 5QIs and Uu logical channel priorities.

Mapping relationship three is a mapping configuration between NR PC5 DRBs and LTE Uu DRBs, which includes at least one of a mapping between PC5 DRB priorities and Uu DRB priorities, a mapping between PC5 DRB identifiers and Uu DRB identifiers or a mapping between PC5 logical channel priorities and Uu logical channel priorities.

The base station sends the preceding configuration information to the relay UE through an RRC reconfiguration message.

In an implementation, due to the mobility of a UE and the dynamics of a network environment, a Uu link quality or a relay link quality of the UE deteriorates. In this case, the UE may choose to switch from a Uu connection to a relay connection, from a relay connection to a Uu connection, or from one relay UE to another relay UE, so as to maintain a UE-to-network data transmission. In the embodiment, how to maintain service continuity in a switching process is described.

For example, network link switching occurs in one of the scenarios below.

Scenario one is path switching from a direct Uu link to a PC5/SL relay link. Remote UE1 in an RRC connected state communicates through the direct Uu link. When a Uu channel quality deteriorates, UE1 searches for a relay UE and switches Uu traffic to the relay UE forwarding data to a network. A base station of the remote UE and a base station of the relay UE may be the same or different.

Scenario two is path switching from a PC5/SL relay link to a direct Uu link. Remote UE1 communicates with a network through a relay UE. When UE1 enters the coverage of a base station and establishes an RRC connection, traffic forwarded by the relay UE is switched to a Uu interface to be directly transmitted. The base station of the remote UE and a base station of the relay UE may be the same or different.

Scenario three: Due to relay reselection, a relay UE connected to a remote UE changes, and traffic of the remote UE forwarded by relay UE1 is switched to relay UE2 to be forwarded. A base station of relay UE1 and a base station of relay UE2 may be the same or different.

A link switching policy includes the two mapping configurations below.

In mapping configuration one, the base station configures a link switching criterion or a measurement configuration. The base station is notified when the remote UE satisfies the criterion, or the remote UE reports a measurement result to the base station according to a measurement reporting configuration, and the base station determines and indicates the switching.

In mapping configuration two, the base station configures or preconfigures a link switching criterion. When the remote UE satisfies the criterion, the remote UE performs autonomous switching. Optionally, the remote UE notifies the base station after the switching. Link switching notification information reported by the remote UE to the base station includes at least one of a switching indication, a traffic type of the switching, an ID of a PDU session of the switching, a DRB of the switching, information about a QoS flow (such as a QFI/5QI) of the switching or an identifier of a relay UE.

In scenario one, the link switching criterion includes at least one of a Uu link quality threshold (which, as is known, includes a certain hysteresis value; in the case where a Uu link quality of the remote UE is lower than the threshold, link switching may be performed), a traffic type (for example, data of a certain traffic type is transmitted through a PC5 interface) or a PC5 interface link quality threshold (for example, in the case where a PC5 interface link quality between the remote UE and the relay UE is higher than the threshold, link switching may be performed). The measurement configuration includes a Uu measurement configuration and a relay (a PC5 interface between the UE and the relay UE) measurement configuration. In scenario two, the link switching criterion includes at least one of a Uu link quality threshold (which, as is known, includes a certain hysteresis value; in the case where a Uu link quality of the remote UE is higher than the threshold, link switching may be performed), a PC5 link quality threshold (for example, in the case where a PC5 interface link quality between the remote UE and the relay UE is lower than the threshold, link switching may be performed), a Uu link quality threshold of the relay UE (optionally, the relay UE notifies the remote UE of its Uu link quality or Uu link quality level indication (for example, an indication that the Uu link quality is higher/lower than the threshold or an indication that the Uu link quality is good/medium/poor) through a PC5 RRC signaling message), a CBR threshold of a PC5 interface resource pool (for example, if a CBR of the PC5 interface resource pool or an average CBR of all resource pools is higher than the threshold, it indicates that the relay link has an increasing load and link switching may be performed) or a traffic type/traffic requirement (for example, data of some traffic type/data with some traffic requirement (for example, a delay is required to be lower than a certain threshold) is switched to the Uu interface for transmission). As is known, the Uu link quality is the measured reference signal receiving power/reference signal receiving quality (RSRP/RSRQ) of the Uu interface, and the PC5 link quality is the measured RSRP/RSRQ/received signal strength indicator (RSSI) of an SL discovery channel or communication channel.

For UE-to-network path/link switching described in the above three scenarios, the remote UE does not maintain an RRC connection with a gNB in a UE-to-network relay.

In scenario one, the remote UE switches from Uu data communication to relay data communication, and the remote UE needs to establish a new PC5 PDCP/RLC layer for a relay data transmission. To-be-transmitted uplink data buffered in the remote UE is processed as follows.

1. An unprocessed IP data packet in the remote UE is directly switched to the relay link for transmission.
2. For a data packet having been mapped to a Uu QoS flow in the remote UE, data in the Uu QoS flow is mapped to a PC5 QoS flow based on a mapping configuration from Uu QoS flows to PC5 QoS flows which is configured or preconfigured by the base station, or data in the Uu QoS flow is mapped to a PC5 DRB based on a mapping configuration from Uu QoS flows to PC5 DRBs which is configured or preconfigured by the base station.
3. For a data packet having been mapped to a Uu DRB in the remote UE, since the remote UE establishes a new PC5 PDCP layer, data in the Uu DRB needs to be decrypted according to a Uu PDCP and then is mapped to a PC5 DRB according to a mapping configuration from Uu DRBs to PC5 DRBs which is configured or preconfigured by the base station.

For downlink data buffered in the gNB, since the remote UE uses an L3 UE-to-network relay and establishes no RRC connection with the gNB after the switching, the downlink data buffered in the gNB cannot be switched to the relay link for transmission. To maintain the service continuity, the remote UE needs to complete the transmission of the downlink data before the switching.

In scenario two, the remote UE switches from relay data communication to Uu data communication, and the remote UE needs to establish a new Uu PDCP/RLC layer for a Uu data transmission. To-be-transmitted uplink data buffered in the remote UE is processed as follows.

1. An unprocessed IP data packet in the remote UE is directly switched to the Uu link for transmission.
2. For a data packet having been mapped to a PC5 QoS flow in the remote UE, data in the PC5 QoS flow is mapped to a Uu QoS flow based on a mapping configuration from PC5 QoS flows to Uu QoS flows which is configured or preconfigured by the base station, or data in the PC5 QoS flow is mapped to a Uu DRB based on a mapping configuration from PC5 QoS flows to Uu DRBs which is configured or preconfigured by the base station.
3. For a data packet having been mapped to a PC5 DRB in the remote UE, since the remote UE establishes a new Uu PDCP layer, data in the PC5 DRB needs to be decrypted according to a PC5 PDCP and then is mapped to a Uu DRB according to a mapping configuration from PC5 DRBs to Uu DRBs which is configured or preconfigured by the base station.

The relay UE continues an uplink transmission of uplink data buffered in the relay UE.

For downlink data buffered in the gNB, since the remote UE uses an L3 UE-to-network relay and establishes no RRC connection with the gNB before the switching, the gNB cannot know the switching behavior of the remote UE. Therefore, the downlink data buffered in the gNB cannot be switched to the Uu link of the remote UE for transmission and can only be discarded. For the same reason, the relay UE cannot transfer downlink data buffered in the relay UE to the Uu of the remote UE for transmission so that the transmission needs to be completed before the switching of the remote UE.

In scenario three, the remote UE switches from relay UE1 to relay UE2, and the remote UE needs to establish a new PC5 PDCP/RLC layer for a relay data transmission. For to-be-transmitted uplink data buffered in the remote UE, an IP data packet and a PC5 QoS flow data packet to be sent to relay UE1 are sent to relay UE2. For data having been mapped to a PC5 DRB established with relay UE1, the data is decrypted according to a PDCP layer established with relay UE1 and then mapped to a PC5 DRB established with relay UE2 and having the same logical channel priority for transmission.

Relay UE1 continues an uplink transmission of uplink data buffered in relay UE1.

Since relay UE1 and relay UE2 cannot communicate with each other, downlink data buffered in relay UE1 can only be discarded.

For downlink data buffered in the gNB, since the remote UE uses an L3 UE-to-network relay and establishes no RRC connection with the gNB before the switching, the gNB cannot know the switching behavior of the remote UE. Therefore, the downlink data buffered in the gNB cannot be switched to the Uu link of the remote UE for transmission and can only be discarded.

Figure 9:
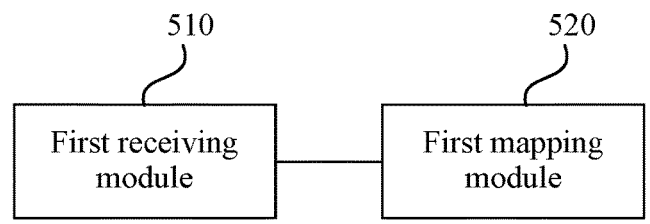
FIG. 9 is a block diagram of a communication apparatus according to an embodiment of the present application.

In an embodiment, FIG. 9 is a block diagram of a communication apparatus according to an embodiment of the present application. The embodiment is applied to a first communication node. As shown in FIG. 9, the communication apparatus in the embodiment includes a first receiving module 510 and a first mapping module 520.

The first receiving module 510 is configured to receive IP data from a second communication node.

The first mapping module 520 is configured to map the IP data to a relay bearer in a first preset mapping configuration and transmit the IP data to a third communication node.

The communication apparatus provided in the embodiment is configured to perform the communication method applied by the first communication node in the embodiment shown in FIG. 1 and has similar implementation principles and technical effects, which are not repeated here.

In an embodiment, a PDU session selected by the first communication node for the IP data includes one of the following.

An independent PDU session is established for the IP data and the IP data is transmitted on a DRB corresponding to the PDU session.

The IP data is transmitted by using a PDU session of the first communication node.

In an embodiment, in the case where at least two second communication nodes are connected to the same first communication node, the first preset mapping configuration includes one of a one-to-one mapping or a many-to-one mapping.

The one-to-one mapping is used for indicating that IP data of different second communication nodes is sent through different relay Uu DRBs, separately; and the many-to-one mapping is used for indicating that IP data of the at least two second communication nodes is mapped to the same relay Uu DRB to be sent.

In an embodiment, in the case where the first communication node is connected to the second communication node through NR PC5 and the second communication node is connected to the third communication node through an NR Uu, the many-to-one mapping includes one of the mapping configurations below.

The IP data of the second communication node is mapped to a relay Uu DRB according to a Uu QoS rule and a DRB configuration of the first communication node.

The IP data is mapped to a relay Uu DRB based on a mapping relationship between PC5 DRBs and Uu DRBs which is configured or preconfigured by the third communication node.

The IP data is mapped to a relay Uu DRB based on a mapping relationship between PC5 QoS flows and NR Uu QoS flows and an NR Uu DRB configuration which are configured or preconfigured by the third communication node.

The IP data is mapped to a relay Uu DRB based on a mapping relationship between PC5 QoS flows and Uu DRBs which is configured or preconfigured by the third communication node.

In an embodiment, in the case where the first communication node is connected to the second communication node through NR PC5 and the second communication node is connected to the third communication node through the NR Uu, before the IP data is received from the second communication node, the method further includes the following.

A relay connection request and a PC5 unicast connection request are received from the second communication node.

A Uu DRB and a downlink PC5 DRB and a mapping between uplink and downlink data are established according to configuration information fed back by the third communication node.

In an embodiment, in the case where the first communication node is connected to the second communication node through NR PC5 and the second communication node is connected to the third communication node through the NR Uu, during establishing of a Layer2 link connection between the first communication node and the second communication node, pre-acquired PC5 QoS information is mapped to Uu QoS information in a third preset mapping configuration.

In an embodiment, the third preset mapping configuration includes the following. A PQI in a PC5 QoS flow is mapped to an identical Uu 5QI.

In the case where the identical Uu 5QI does not match the PQI, a 5QI closest to a QoS attribute represented by the PQI is selected from a standard 5QI list.

A GFBR value and an MFBR value in a Uu QoS flow are set to a GFBR value and an MFBR value in the PC5 QoS flow.

In an embodiment, after the pre-acquired PC5 QoS information is mapped to the Uu QoS information, the method further includes the following.

A PDU session establishment request is sent to the third communication node according to a Uu QoS flow, where the PDU session establishment request is used for forwarding the IP data of the second communication node.

Alternatively, a PDU session modification request is sent to the third communication node, where the PDU session modification request is used for modifying a current PDU session and carrying the Uu QoS information obtained after the mapping.

In an embodiment, the communication apparatus further includes a second receiving module.

The second receiving module is configured to receive a relay Uu DRB or a PC5 DRB and a mapping relationship between PC5 data and Uu data which are configured by the third communication node.

In an embodiment, in the case where the first communication node is connected to the second communication node through NR PC5 and the second communication node is connected to the third communication node through the NR Uu, the mapping relationship between PC5 data and Uu data includes one of: a mapping between PC5 QoS flows and Uu QoS flows, a mapping between PC5 DRBs and Uu DRBs, a mapping between PC5 QoS flows and Uu DRBs or a mapping between PC5 DRBs and Uu QoS flows.

In an embodiment, in the case where the first communication node is connected to the second communication node through NR PC5 and the second communication node is connected to the third communication node through the NR Uu, a time period within which the third communication node configures the mapping relationship between PC5 data and Uu data for the first communication node includes one of the following.

A time period refers to a period after the first communication node sends the PDU session establishment request or the PDU session modification request.

A time period refers to a period after the first communication node and the second communication node establish a PC5 RRC connection, the first communication node reports PC5 DRB information, where the PC5 DRB information includes at least one of: a bearer identifier, an RLC mode, a logical channel identifier, a logical channel priority or an RLC-related configuration.

A time period refers to a period after the first communication node sends $SUI$ to the third communication node.

In an embodiment, in the case where the first communication node is connected to the second communication node through NR PC5 and the second communication node is connected to the third communication node through the NR Uu, the mapping relationship between PC5 data and Uu data includes one of: a mapping configuration between NR PC5 QoS flows and NR Uu QoS flows; a mapping configuration between NR PC5 QoS flows and NR Uu DRBs; a mapping configuration between NR PC5 DRBs and NR Uu DRBs; or a mapping configuration between NR PC5 DRBs and NR Uu QoS flows.

The mapping configuration between NR PC5 QoS flows and NR Uu QoS flows includes at least one of: a mapping between PC5 QoS information and Uu QoS information or a mapping between QFIs and PFIs.

The mapping between PC5 QoS information and Uu QoS information includes at least one of the following. A 5QI in a Uu QoS flow is mapped to an identical PC5 PQI; in the case where the identical Uu 5QI does not match the PQI, a 5QI closest to a QoS attribute represented by the PQI is selected from a standard 5QI list; and a GFBR and an MFBR in the Uu QoS flow are directly set to a GFBR and an MFBR in the PC5 QoS information.

A PQI in a PC5 QoS flow is mapped to an identical Uu 5QI; in the case where the identical Uu 5QI does not match the PQI, a PQI closest to a QoS attribute represented by the 5QI is selected from a standard PQI list; and a GFBR and an MFBR in the PC5 QoS flow are directly set to a GFBR and an MFBR in Uu QoS info.

The mapping configuration between NR PC5 QoS flows and NR Uu DRBs includes at least one of: a mapping between PC5 PFIs and Uu DRB identifiers, a mapping between PC5 PQIs and Uu DRB priorities or a mapping between PC5 PQIs and Uu logical channel priorities.

The mapping configuration between NR PC5 DRBs and NR Uu DRBs includes at least one of: a mapping between PC5 DRB priorities and Uu DRB priorities, a mapping between PC5 DRB identifiers and Uu DRB identifiers, a mapping between PC5 logical channel priorities and Uu logical channel priorities or a mapping between PC5 logical channel identifiers and Uu logical channel identifiers.

The mapping configuration between NR PC5 DRBs and NR Uu QoS flows includes at least one of: a mapping between PC5 DRB identifiers and Uu QFIs, a mapping between PC5 DRB priorities and Uu 5QIs or a mapping between PC5 logical channel priorities and Uu 5QIs.

In an embodiment, in the case where the first communication node is connected to the second communication node through LTE PC5 and the second communication node is connected to the third communication node through an NR Uu, the many-to-one mapping includes one of the mapping configurations below.

The IP data of the second communication node is mapped to a relay NR Uu DRB according to a Uu uplink QoS rule and a DRB configuration of the first communication node.

The IP data is mapped to a relay NR Uu DRB based on a mapping relationship between LTE PC5 logical channels and NR Uu DRBs which is configured or preconfigured by the third communication node.

The IP data of the second communication node is mapped to a Uu QoS flow and then to a relay NR Uu DRB based on a PPPP of PC5 data received from the second communication node and a mapping relationship between PPPPs and 5QIs and an NR Uu DRB configuration which are configured or preconfigured by the third communication node.

The IP data of the second communication node is mapped to a relay NR Uu DRB based on a PPPP value of PC5 data received from the second communication node and a mapping relationship between PPPP values and NR Uu DRBs which is configured or preconfigured by the third communication node.

In an embodiment, in the case where the first communication node is connected to the second communication node through LTE PC5 and the second communication node is connected to the third communication node through the NR Uu, before the IP data is received from the second communication node, the method further includes the following.

A relay connection request and a PC5 unicast connection request are received from the second communication node.

A Uu DRB and a mapping between uplink and downlink data are established according to configuration information fed back by the third communication node.

In an embodiment, in the case where the first communication node is connected to the second communication node through LTE PC5 and the second communication node is connected to the third communication node through the NR Uu, during establishing of a Layer2 link connection between the first communication node and the second communication node, a pre-acquired PPPP value is mapped to NR Uu QoS information in a fourth preset mapping configuration.

In an embodiment, the fourth preset mapping configuration includes the following.

A PPPP-5QI mapping table configured or preconfigured by the third communication node is based on.

In an embodiment, after the pre-acquired PC5 PPPP value is mapped to the NR Uu QoS information, the method further includes the following.

A PDU session establishment request is sent to the third communication node according to the Uu QoS information, where the PDU session establishment request is used for forwarding the IP data of the second communication node.

Alternatively, a PDU session modification request is sent to the third communication node, where the PDU session modification request is used for modifying a current PDU session and carrying the Uu QoS information obtained after the mapping.

In an embodiment, the communication method further includes: receiving a relay Uu DRB and a mapping relationship between PC5 data and Uu data which are configured by the third communication node.

In an embodiment, in the case where the first communication node is connected to the second communication node through LTE PC5 and the second communication node is connected to the third communication node through the NR Uu, the mapping relationship between PC5 data and Uu data includes one of: a mapping between PC5 logical channels and Uu DRBs, a mapping between PC5 PPPP data flows and Uu DRBs or a mapping between PC5 PPPP data flows and Uu QoS flows.

In an embodiment, in the case where the first communication node is connected to the second communication node through LTE PC5 and the second communication node is connected to the third communication node through the NR Uu, a time period within which the third communication node configures the mapping relationship between PC5 data and Uu data for the first communication node includes one of the following.

A time period refers to a period after the first communication node sends the PDU session establishment request or the PDU session modification request.

A time period refers to a period after the first communication node and the second communication node establish a relay connection, the first communication node reports LTE PC5 logical channel information, where the PC5 logical channel information includes at least one of: an RLC mode, a logical channel identifier, a logical channel priority or an RLC-related configuration.

A time period refers to a period after the first communication node sends *SUI* to the third communication node.

In an embodiment, in the case where the first communication node is connected to the second communication node through LTE PC5 and the second communication node is connected to the third communication node through the NR Uu, the mapping relationship between PC5 data and Uu data includes one of: a mapping configuration between LTE PC5 logical channels and NR Uu DRBs; a mapping configuration between LTE PC5 PPPP flows and NR Uu DRBs; a mapping configuration between LTE PC5 PPPP flows and NR Uu QoS flows; or a mapping configuration between LTE PC5 PPPP values and NR Uu QoS information.

The mapping configuration between LTE PC5 logical channels and NR Uu DRBs includes at least one of: a mapping between LTE PC5 logical channel identifiers and NR Uu DRB identifiers, a mapping between LTE PC5 logical channel priorities and NR Uu DRB priorities, a mapping between LTE PC5 logical channel priorities and NR Uu logical channel priorities or a mapping between LTE PC5 logical channel identifiers and NR Uu logical channel identifiers.

The mapping configuration between LTE PC5 PPPP flows and NR Uu DRBs includes at least one of: a mapping configuration between LTE PPPP values and Uu DRB priorities or a mapping between LTE PPPP values and Uu logical channel priorities.

The mapping configuration between LTE PC5 PPPP flows and NR Uu QoS flows includes at least one of a mapping configuration between LTE PPPP values and NR Uu QoS information.

The mapping configuration between LTE PC5 PPPP values and NR Uu QoS information includes at least one of a mapping table between LTE PC5 PPPP values and NR Uu 5QIs.

In an embodiment, in the case where the first communication node is connected to the second communication node through NR PC5 and the second communication node is connected to the third communication node through an LTE Uu, the many-to-one mapping includes one of the mapping configurations below.

The IP data of the at least two second communication nodes is mapped to an LTE Uu DRB according to an uplink TFT and a DRB configuration of the first communication node.

The IP data is mapped to an LTE Uu DRB based on a mapping relationship between NR PC5 DRBs and LTE Uu DRBs which is configured or preconfigured by the third communication node.

The IP data is mapped to an LTE Uu DRB based on a mapping relationship between NR PC5 QoS flows and LTE Uu DRBs which is configured or preconfigured by the third communication node.

The IP data is mapped to an LTE Uu DRB based on a mapping relationship between NR PC5 QoS flows and LTE Uu EPS bearers and an LTE Uu DRB configuration which are configured or preconfigured by the third communication node.

In an embodiment, in the case where the first communication node is connected to the second communication node through NR PC5 and the second communication node is connected to the third communication node through the LTE Uu, pre-acquired NR PC5 QoS information is mapped to LTE Uu QoS information in a fifth preset mapping configuration.

In an embodiment, the fifth preset mapping configuration includes the following.

A PQI in an NR PC5 QoS flow is mapped to an identical LTE Uu 5QI.

In the case where the identical LTE Uu 5QI does not match the PQI, a QCI closest to a QoS attribute represented by the PQI is selected from a standard LTE QCI list.

A GFBR value and an MFBR value in a Uu QoS flow are set to a GFBR and an MFBR value in the PC5 QoS flow.

In an embodiment, after the pre-acquired PC5 PPPP value is mapped to the NR Uu QoS information, the method further includes the following.

A PDU session establishment request is sent to the third communication node according to the Uu QoS information, where the PDU session establishment request is used for forwarding the IP data of the second communication node.

Alternatively, a PDU session modification request is sent to the third communication node, where the PDU session modification request is used for modifying a current PDU session and carrying the Uu QoS information obtained after the mapping.

In an embodiment, the communication apparatus further includes a third receiving module. The third receiving module is configured to receive a relay Uu DRB and a mapping relationship between PC5 data and Uu data which are configured by the third communication node.

In an embodiment, in the case where the first communication node is connected to the second communication node through NR PC5 and the second communication node is connected to the third communication node through the LTE Uu, the mapping relationship between PC5 data and Uu data includes one of: a mapping between NR PC5 QoSs and LTE Uu EPS bearers, a mapping between NR PC5 DRBs and LTE Uu DRBs, a mapping between NR PC5 QoS flows and LTE Uu DRBs or a mapping between NR PC5 DRBs and LTE Uu EPS bearers.

In an embodiment, in the case where the first communication node is connected to the second communication node through NR PC5 and the second communication node is connected to the third communication node through the LTE Uu, a time period within which the third communication node configures the mapping relationship between PC5 data and Uu data for the first communication node includes one of the following.

After the first communication node sends a PDU session connectivity request or a bearer resource modification request.

After the first communication node and the second communication node establish a PC5 RRC connection, the first communication node reports NR PC5 DRB information, where the NR PC5 DRB information includes at least one of: a bearer identifier, an RLC mode, a logical channel identifier, a logical channel priority or an RLC-related configuration.

After the first communication node sends SUI to the third communication node.

In an embodiment, in the case where the first communication node is connected to the second communication node through NR PC5 and the second communication node is connected to the third communication node through the LTE Uu, the mapping relationship between PC5 data and Uu data includes one of: a mapping configuration between NR PC5 QoS flows and LTE Uu EPS bearers; a mapping configuration between NR PC5 QoS flows and LTE Uu DRBs; a mapping configuration between NR PC5 DRBs and LTE Uu DRBs; or a mapping configuration between NR PC5 DRBs and LTE Uu EPS bearers.

The mapping configuration between NR PC5 QoS flows and LTE Uu EPS bearers includes at least one of: a mapping between PC5 QFIs and Uu EPS bearer identifiers or a mapping between NR PC5 QoS info and LTE Uu QoS info.

The mapping between PC5 QoS info and Uu QoS info includes at least one of the following. A QCI in a Uu QoS flow is mapped to an identical PC5 PQI. In the case where the identical Uu QCI does not match the PQI, a QCI closest to a QoS attribute represented by the PQI is selected from a standard QCI list. A GFBR and an MFBR in the Uu QoS flow are directly set to a GFBR and an MFBR in the PC5 QoS info.

A PQI in a PC5 QoS flow is mapped to an identical Uu QCI. In the case where the identical Uu QCI does not match the PQI, a PQI closest to a QoS attribute represented by the QCI is selected from a standard PQI list. A GFBR and an MFBR in the PC5 QoS flow are directly set to a GFBR and an MFBR in Uu QoS info.

The mapping configuration between NR PC5 QoS flows and LTE Uu DRBs includes at least one of: a mapping between PC5 PFIs and Uu DRB identifiers, a mapping between PC5 PQIs and Uu DRB priorities or a mapping between PC5 PQIs and Uu logical channel priorities.

The mapping configuration between NR PC5 DRBs and LTE Uu DRBs includes at least one of: a mapping between PC5 DRB priorities and Uu DRB priorities, a mapping between PC5 DRB identifiers and Uu DRB identifiers, a mapping between PC5 logical channel priorities and Uu logical channel priorities or a mapping between NR PC5 logical channel identifiers and LTE Uu logical channel identifiers.

The mapping configuration between NR PC5 DRBs and LTE Uu EPS bearers includes at least one of: a mapping between PC5 DRB priorities and Uu EPS bearer QCIs, a mapping between PC5 DRB identifiers and Uu EPS bearer identifiers or a mapping between PC5 logical channels and Uu EPS bearer QCIs.

In an embodiment, in the case where a Uu link quality or a relay link quality of the second communication node fails, a switching manner of the second communication node includes one of: switching from a Uu connection to a relay connection; switching from a relay connection to a Uu connection; or switching from a connection to a first communication node in a first place to a connection to a first communication node in a second place.

In an embodiment, in the case where the switching manner of the second communication node is switching from the Uu connection to the relay connection, to-be-transmitted uplink data buffered in the second communication node includes one of the connection manners below.

Unprocessed IP data in the second communication node is directly switched to a relay link for transmission.

For IP data having been mapped to a Uu QoS flow in the second communication node, the Uu QoS flow is mapped to a PC5 QoS flow based on a mapping configuration from Uu QoS flows to PC5 QoS flows which is configured or preconfigured by the third communication node, or the Uu QoS flow is mapped to a PC5 DRB based on a mapping configuration from Uu QoS flows to PC5 DRBs which is configured or preconfigured by the third communication node.

For IP data having been mapped to a Uu DRB in the second communication node, the IP data is decrypted according to a Uu PDCP, and the Uu DRB is mapped to a PC5 DRB based on a mapping configuration from Uu DRBs to PC5 DRBs which is configured or preconfigured by the third communication node.

In an embodiment, in the case where the switching manner of the second communication node is switching from the relay connection to the Uu connection, to-be-transmitted uplink data buffered in the second communication node includes one of the connection manners below.

Unprocessed IP data in the second communication node is directly switched to a Uu link for transmission.

For IP data having been mapped to a PC5 QoS flow in the second communication node, the PC5 QoS flow is mapped as a Uu QoS flow based on a mapping configuration from PC5 QoS flows to Uu QoS flows which is configured or preconfigured by the third communication node, or the PC5 QoS flow is mapped to a Uu DRB based on a mapping configuration from PC5 QoS flows to Uu DRBs which is configured or preconfigured by the third communication node.

For IP data having been mapped to a PC5 DRB in the second communication node, the IP data is decrypted according to a PC5 PDCP, and the PC5 DRB is mapped to a Uu DRB based on a mapping configuration from PC5 DRBs to Uu DRBs which is configured or preconfigured by the third communication node.

In an embodiment, in the case where the switching manner of the second communication node is switching from the first communication node in the first place to the first communication node in the second place, to-be-transmitted uplink data buffered in the second communication node includes one of the connection manners below.

IP data and PC5 QoS flow data from the second communication node to a first communication node in the first place is forwarded to a first communication node in the second place.

For IP data having been mapped to a PC5 DRB established with the first communication node in the first place, the IP data is decrypted according to a PDCP layer established with the first communication node in the second place and mapped to a PC5 DRB established with the first communication node in the second place and having the same logical channel priority.

For IP data having been buffered in the first communication node in the first place, the first communication node in the first place continues an uplink transmission.

In an embodiment, in the case where the Uu link quality or the relay link quality of the second communication node fails, a link switching policy includes one of the following.

A link switching criterion or a measurement configuration is configured by the third communication node.

A link switching criterion is configured or preconfigured by the third communication node.

In an embodiment, in the case where the switching manner of the second communication node is switching from the Uu connection to the relay connection, the link switching criterion includes at least one of: a Uu link quality threshold, a traffic type or a PC5 interface link quality threshold.

The measurement configuration includes a Uu measurement configuration and a relay measurement configuration.

In an embodiment, in the case where the switching manner of the second communication node is switching from the relay connection to the Uu connection, the link switching criterion includes at least one of: a Uu link quality threshold; a PC5 interface link quality threshold; a Uu link quality threshold of the first communication node; a CBR threshold of a PC5 interface resource pool; or a traffic type/traffic requirement.

Figure 10:
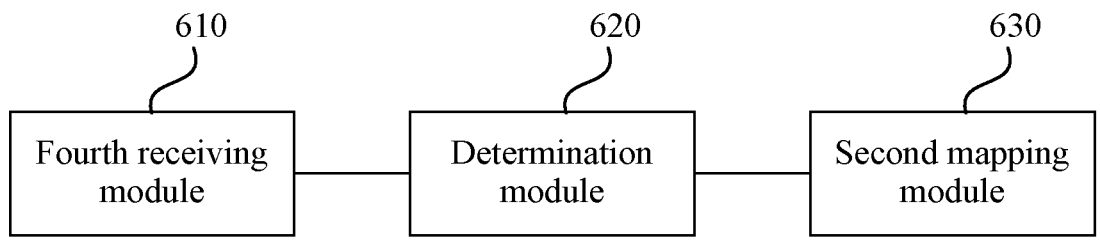
FIG. 10 is a block diagram of another communication apparatus according to an embodiment of the present application.

FIG. 10 is a block diagram of another communication apparatus according to an embodiment of the present application. As shown in FIG. 10, the communication apparatus in the embodiment includes a fourth receiving module 610, a determination module 620 and a second mapping module 630.

The fourth receiving module 610 is configured to receive downlink data from a third communication node.

The determination module 620 is configured to determine a second communication node to which the downlink data belongs according to an IP address in the downlink data.

The second mapping module 630 is configured to map the downlink data to PC5 data in a second preset mapping configuration and transmit the PC5 data to the second communication node to which the downlink data belongs.

The communication apparatus provided in the embodiment is configured to perform the communication method applied by a first communication node in the embodiment shown in FIG. 2 and has similar implementation principles and technical effects, which are not repeated here.

In an embodiment, in the case where the first communication node is connected to the second communication node through NR PC5 and the second communication node is connected to the third communication node through an NR Uu, the second preset mapping configuration includes one of the mapping configurations below.

The downlink data is mapped to a corresponding PC5 DRB according to a QoS rule derived by the first communication node and a PC5 DRB configuration configured by the third communication node.

In the case where a PC5 DRB is a bi-directional bearer, a reverse mapping is performed based on a mapping relationship from uplink PC5 DRBs to Uu DRBs.

A Uu QoS flow is mapped to a PC5 QoS flow and the PC5 QoS flow is then mapped to a PC5 DRB based on a mapping relationship from NR Uu QoS flows to PC5 QoS flows and a PC5 DRB configuration which are configured by the third communication node.

The downlink data is mapped to a PC5 DRB based on a mapping relationship from NR Uu QoS flows to PC5 DRBs which is configured or preconfigured by the third communication node.

The downlink data is mapped to a PC5 DRB based on a mapping relationship between Uu DRBs and PC5 DRBs which is configured or preconfigured by the third communication node.

In an embodiment, in the case where the first communication node is connected to the second communication node through LTE PC5 and the second communication node is connected to the third communication node through an NR Uu, the second preset mapping configuration includes one of the mapping configurations below.

IP data of the second communication node is mapped to an LTE PC5 logical channel based on a mapping relationship between NR Uu DRBs and LTE PC5 logical channels which is configured or preconfigured by the third communication node.

IP data of the second communication node is mapped to an LTE PC5 logical channel based on a mapping relationship between NR Uu DRBs and LTE PC5 PPPP values which is configured or preconfigured by the third communication node.

IP data of the second communication node is mapped to an LTE PC5 logical channel based on a mapping relationship between NR Uu QoS flows and LTE PC5 PPPP data flows which is configured or preconfigured by the third communication node.

In an embodiment, in the case where the first communication node is connected to the second communication node through NR PC5 and the second communication node is connected to the third communication node through an LTE Uu, the second preset mapping configuration includes one of the mapping configurations below.

The downlink data is mapped to a corresponding NR PC5 DRB according to a QoS rule derived by the first communication node and a PC5 DRB configuration configured by the third communication node.

IP data is mapped to an NR PC5 DRB based on a mapping relationship between LTE Uu DRBs and NR PC5 DRBs which is configured or preconfigured by the third communication node.

IP data is mapped to an NR PC5 DRB based on a mapping relationship between LTE Uu DRBs and NR PC5 QoS flows which is configured or preconfigured by the third communication node.

IP data is mapped to an LTE Uu DRB based on a mapping relationship between LTE Uu EPS bearers and NR PC5 QoS flows and an LTE Uu DRB configuration which are configured or preconfigured by the third communication node.

Figure 11:
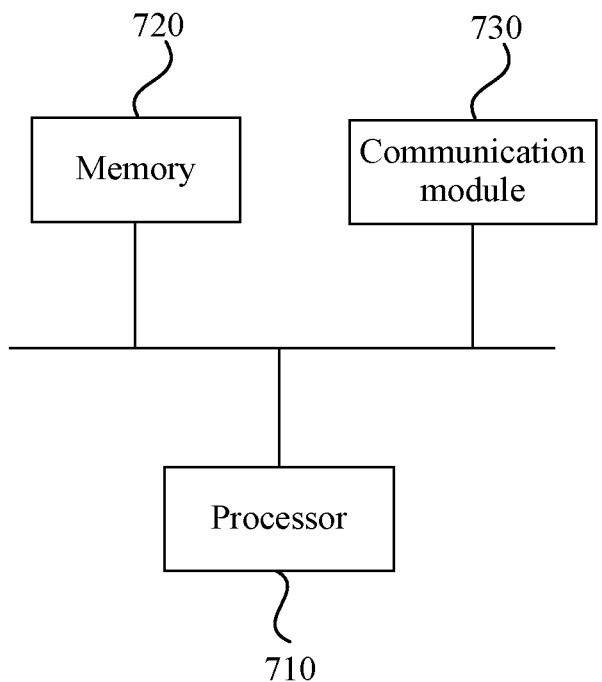
FIG. 11 is a structural diagram of a device according to an embodiment of the present application.

FIG. 11 is a structural diagram of a device according to an embodiment of the present application. As shown in FIG. 11, the device provided in the present application includes a processor 710, a memory 720 and a communication module 730. One or more processors 710 may be provided in the device, with one processor 710 shown as an example in FIG. 11. One or more memories 720 may be provided in the device, with one memory 720 shown as an example in FIG. 11. The processor 710, the memory 720 and the communication module 730 in the device may be connected via a bus or in other manners. FIG. 11 shows the connection via a bus as an example. In the embodiment, the device is a first communication node.

As a computer-readable storage medium, the memory 720 may be configured to store software programs and computer-executable programs and modules, such as program instructions/modules (for example, the first receiving module and the first mapping module in the communication apparatus) corresponding to the device according to any embodiment of the present application. The memory 720 may include a program storage region and a data storage region, where the program storage region may store an operating system and an application program required by at least one function, and the data storage region may store data created depending on the use of the device. Additionally, the memory 720 may include a high-speed random-access memory and may further include a non-volatile memory, for example, at least one magnetic disk memory, a flash memory or another non-volatile solid-state memory. In some examples, the memory 720 may further include memories remotely disposed relative to the processor 710, and these remote memories may be connected to the device via a network. Examples of the preceding network include, but are not limited to, the Internet, an intranet, a local area network, a mobile communication network and a combination thereof.

The communication module 730 is configured for a communication connection between the first communication node and a second communication node to perform data communication and signal communication.

The preceding device may be configured to perform the communication method applied by the first communication node in any one of the preceding embodiments and has the corresponding functions and effects.

An embodiment of the present application further provides a storage medium including a computer-executable instruction. When the computer-executable instruction is executed by a computer processor, a communication method applied by a first communication node is performed. The method includes: receiving IP data from a second communication node; and mapping the IP data to a relay bearer in a first preset mapping configuration, and transmitting the mapped IP data to a third communication node.

An embodiment of the present application further provides a storage medium including a computer-executable instruction. When the computer-executable instruction is executed by a computer processor, a communication method applied by a first communication node is performed. The method includes: receiving downlink data from a third communication node; determining a second communication node to which the downlink data belongs according to an IP address in the downlink data; and mapping the downlink data to PC5 data in a second preset mapping configuration, and transmitting the PC5 data to the second communication node to which the downlink data belongs.

It is to be understood by those skilled in the art that the term "user equipment" covers any suitable type of wireless user equipment, for example, a mobile phone, a portable data processing device, a portable web browser or a vehicle-mounted mobile station.

Generally speaking, embodiments of the present application may be implemented in hardware or special-purpose circuits, software, logics or any combination thereof. For example, some aspects may be implemented in hardware while other aspects may be implemented in firmware or software executable by a controller, a microprocessor or another computing device, though the present application is not limited thereto.

Embodiments of the present application may be implemented through the execution of computer program instructions by a data processor of a mobile device, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored on a memory. The memory may be of any type suitable for a local technical environment and may be implemented using any suitable data storage technology such as, but not limited to, a read-only memory (ROM), a random-access memory (RAM) or an optical memory device and system (a digital video disc (DVD) or a compact disc (CD)). Computer-readable media may include non-transitory storage media. The data processor may be of any type suitable for the local technical environment, such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. A communication method, comprising:
receiving, by a first communication node, Internet Protocol (IP) data from a plurality of second communication nodes, wherein the plurality of second communication nodes are connected to the first communication node through a New Radio (NR) sidelink (PC5) interface, and the first communication node is further connected to a third communication node through an NR Uu interface;
mapping, by the first communication node, the IP data to a relay bearer according to a first preset mapping configuration, wherein the first preset mapping configuration comprises a many-to-one mapping indicating that the IP data is mapped to a same relay Uu data radio bearer (DRB); and
transmitting, by the first communication node to the third communication node, the mapped IP data through the relay Uu DRB according to a DRB configuration associated with the first communication node.

2. The communication method of claim 1, wherein the step of mapping the IP data to a relay bearer further comprises:
mapping, by the first communication node, the IP data to the relay Uu DRB based on a Uu quality of service (QoS) rule.

3. The communication method of claim 2, wherein the Uu QoS rule comprises:
mapping data packets in a PC5 QoS flow to a Uu QoS flow based on both (1) a 5G QoS identifier (5QI) on a PC5 interface (PC5 5QI, PQI) of the IP data received from the plurality of second communication nodes on the PC5 interface; and (2) a mapping relationship between 5QIs and PQIs configured by the third communication node.

4. The communication method of claim 1, further comprising:
establishing, by the first communication node, a PDU session for the IP data; and
sending, by the first communication node, the IP data through a data radio bearer (DRB) corresponding to the established PDU session.

5. The communication method of claim 1, wherein the first preset mapping configuration further comprises a one-to-one mapping indicating that the IP data is separately sent through different relay Uu DRBs.

6. A device, comprising:
a memory and one or more processors;
wherein the memory is configured to store one or more programs; and
wherein the one or more programs, when executed by the one or more processors, cause the one or more processors to:
receive Internet Protocol (IP) data from a plurality of second communication nodes, wherein the plurality of second communication nodes are connected to the device through a New Radio (NR) sidelink (PC5) interface, and the device is further connected to a third communication node through an NR Uu interface;
map the IP data to a relay bearer according to a first preset mapping configuration, wherein the first preset mapping configuration comprises a many-to-one mapping indicating that the IP data is mapped to a same relay Uu data radio bearer (DRB); and
transmit, to the third communication node, the mapped IP data through the relay Uu DRB according to a DRB configuration associated with the device.

7. The device of claim 6, wherein the one or more programs, when executed, further cause the one or more processors to map the IP data to the relay Uu DRB based on a Uu quality of service (QoS) rule.

8. The device of claim 7, wherein the Uu QoS rule comprises: mapping data packets in a PC5 QoS flow to a Uu QoS flow based on both (1) a 5G QoS identifier (5QI) on a PC5 interface (PC5 5QI, PQI) of the IP data received from the plurality of second communication nodes on the PC5 interface; and (2) a mapping relationship between 5QIs and PQIs configured by the third communication node.

9. The device of claim 6, wherein the one or more programs, when executed, further cause the one or more processors to:
establish a PDU session for the IP data; and
send the IP data through a data radio bearer (DRB) corresponding to the established PDU session.

10. The device of claim 6, wherein the first preset mapping configuration further comprises a one-to-one mapping indicating that the IP data is separately sent through different relay Uu DRBs.

11. A non-transitory storage medium, which is configured to store a computer program which, when executed by a processor, causes the processor to:

receive Internet Protocol (IP) data from a plurality of second communication nodes, wherein the plurality of second communication nodes are connected to a first communication node through a New Radio (NR) sidelink (PC5) interface, and the first communication node is further connected to a third communication node through an NR Uu interface;

map the IP data to a relay bearer according to a first preset mapping configuration, wherein the first preset mapping configuration comprises a many-to-one mapping indicating that the IP data is mapped to a same relay Uu data radio bearer (DRB); and transmit, to the third communication node, the mapped IP data through the relay Uu DRB according to a DRB configuration associated with the first communication node.

12. The non-transitory storage medium of claim 11, wherein the computer program, when executed, further causes the processor to map the IP data to the relay Uu DRB based on a Uu quality of service (QoS) rule.

13. The non-transitory storage medium of claim 12, wherein the Uu QoS rule comprises: mapping data packets in a PC5 QoS flow to a Uu QoS flow based on both (1) a 5G QoS identifier (5QI) on a PC5 interface (PC5 5QI, PQI) of the IP data received from the plurality of second communication nodes on the PC5 interface; and (2) a mapping relationship between 5QIs and PQIs configured by the third communication node.

14. The non-transitory storage medium of claim 11, wherein the computer program, when executed, further causes the processor to:

establish a PDU session for the IP data; and send the IP data through a data radio bearer (DRB) corresponding to the established PDU session.

15. The non-transitory storage medium of claim 11, wherein the first preset mapping configuration further comprises a one-to-one mapping indicating that the IP data is separately sent through different relay Uu DRBs.

* * * * *